United States Patent [19]

Okada et al.

[11] Patent Number: 5,822,499

[45] Date of Patent: Oct. 13, 1998

[54] METHOD AND APPARATUS FOR PRINTING DATA IN ACCORDANCE WITH A PREVIOUSLY SET PARAMETER REGARDLESS OF CURRENTLY SPECIFIED PARAMETERS

[75] Inventors: Kunio Okada, Kawasaki; Yoshiyuki Kojo; Yukimasa Sato, both of Yokohama, all of Japan

[73] Assignee: Canon Kabushiki Kaisha, Tokyo, Japan

[21] Appl. No.: 702,804

[22] Filed: Aug. 26, 1996

Related U.S. Application Data

[63] Continuation of Ser. No. 83,931, Jun. 28, 1993, abandoned.

[30]     Foreign Application Priority Data

Jun. 30, 1992  [JP]  Japan ................................. 4-173234
Jun. 30, 1992  [JP]  Japan ................................. 4-173252

[51] Int. Cl.⁶ ................................................ G06F 13/00
[52] U.S. Cl. ...................... 395/101; 395/102; 395/110; 395/107
[58] Field of Search .................................. 358/404, 444; 395/101–117, 200.1, 828–834, 284, 800

[56]               References Cited

U.S. PATENT DOCUMENTS

| 4,344,713 | 8/1982  | Cullen ........................................ 400/22  |
| 4,410,234 | 10/1983 | Mikami et al. ........................ 359/218 |
| 4,642,792 | 2/1987  | Clements et al. ........................ 395/117 |
| 4,648,047 | 3/1987  | Berkland et al. ....................... 364/519 |
| 4,901,249 | 2/1990  | Shiota ..................................... 395/115 |
| 4,975,858 | 12/1990 | Ikenoue et al. .......................... 395/148 |
| 4,985,850 | 1/1991  | Okamoto ................................. 395/115 |
| 5,003,494 | 3/1991  | Ng ............................................ 395/110 |
| 5,025,398 | 6/1991  | Nelson .................................... 395/112 |
| 5,036,476 | 7/1991  | Yamaguchi et al. .................... 395/117 |
| 5,047,957 | 9/1991  | Ikenoue ................................... 395/110 |
| 5,050,098 | 9/1991  | Brown, III et al. .................... 395/112 |
| 5,394,514 | 2/1995  | Matsubara .............................. 395/115 |
| 5,402,529 | 3/1995  | Aoki ....................................... 395/110 |
| 5,414,800 | 5/1995  | Kawaguchi ............................. 395/115 |
| 5,475,801 | 12/1995 | Brindle et al. .......................... 395/114 |

FOREIGN PATENT DOCUMENTS 1-171948  7/1989  Japan.

*Primary Examiner*—Lance Leonard Barry
*Attorney, Agent, or Firm*—Fitzpatrick, Cella, Harper & Scinto

[57]               ABSTRACT

An output method and apparatus is provided for storing first control information for controlling an output operation based on externally supplied data and for storing command information for commanding modification of the first control information to second control information that is different from the first control information, and for modifying the first control information to the second control information to control the output operation based on the second control information in accordance with the stored command information, wherein the output operation can be executed based on the first control information.

27 Claims, 25 Drawing Sheets

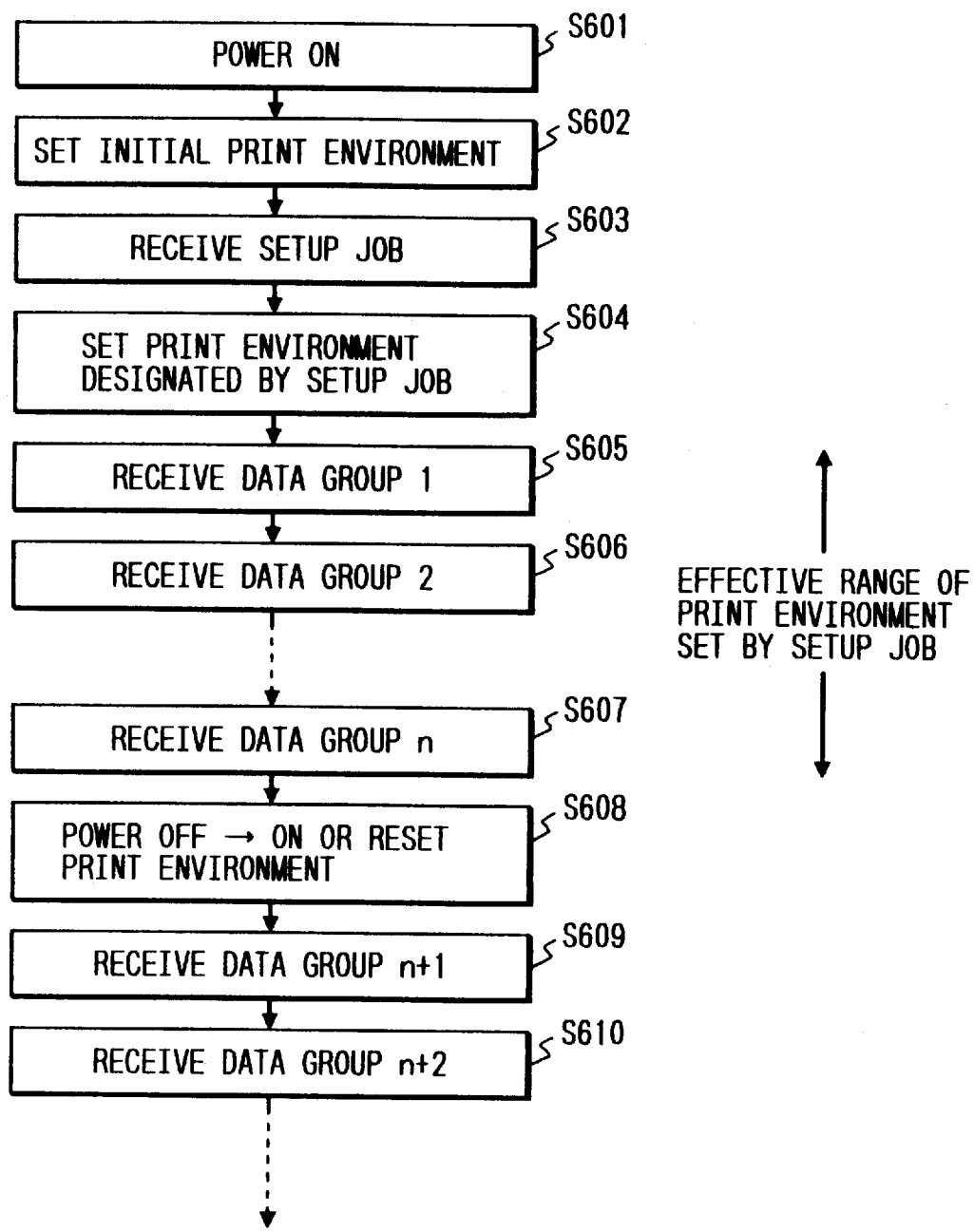

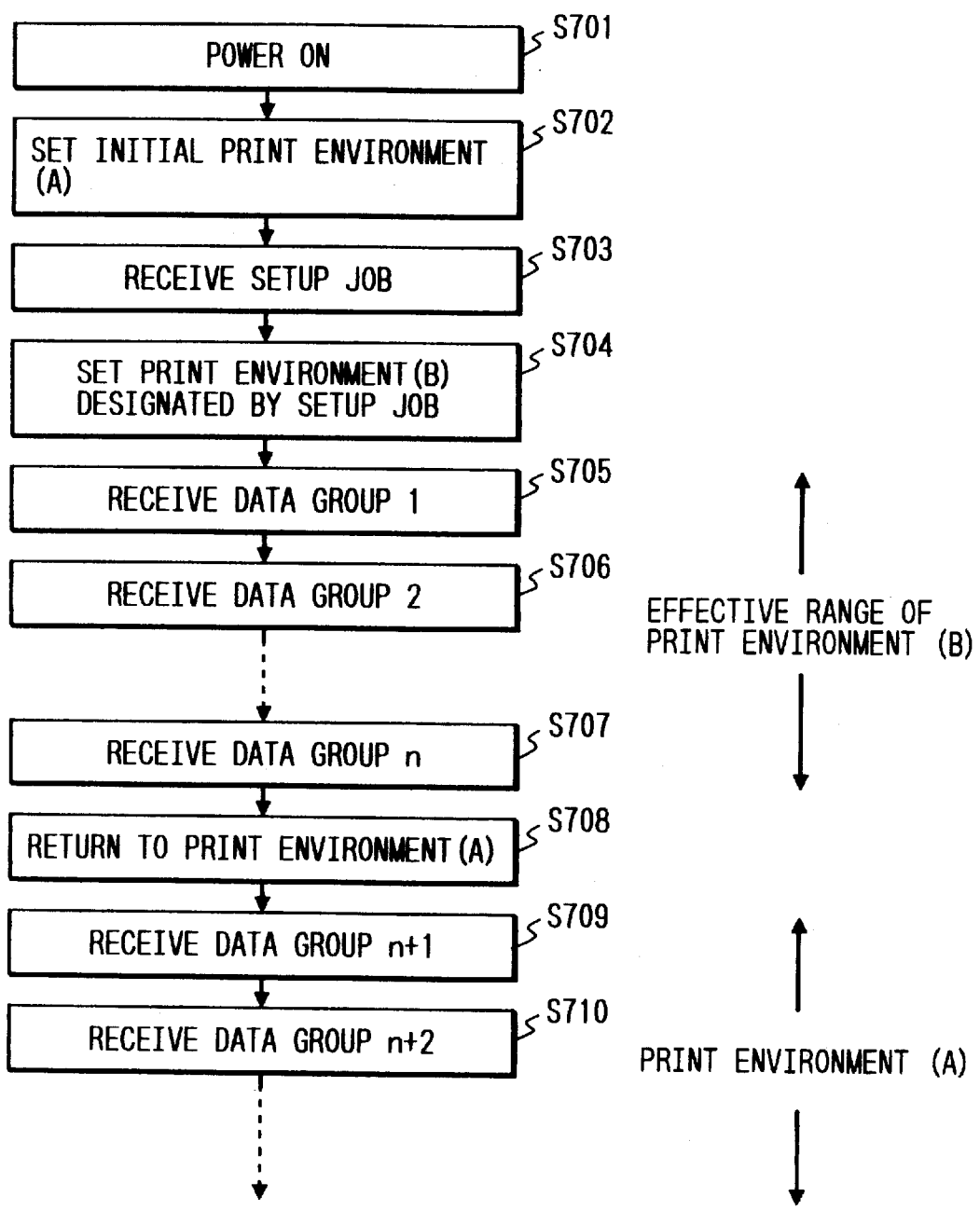

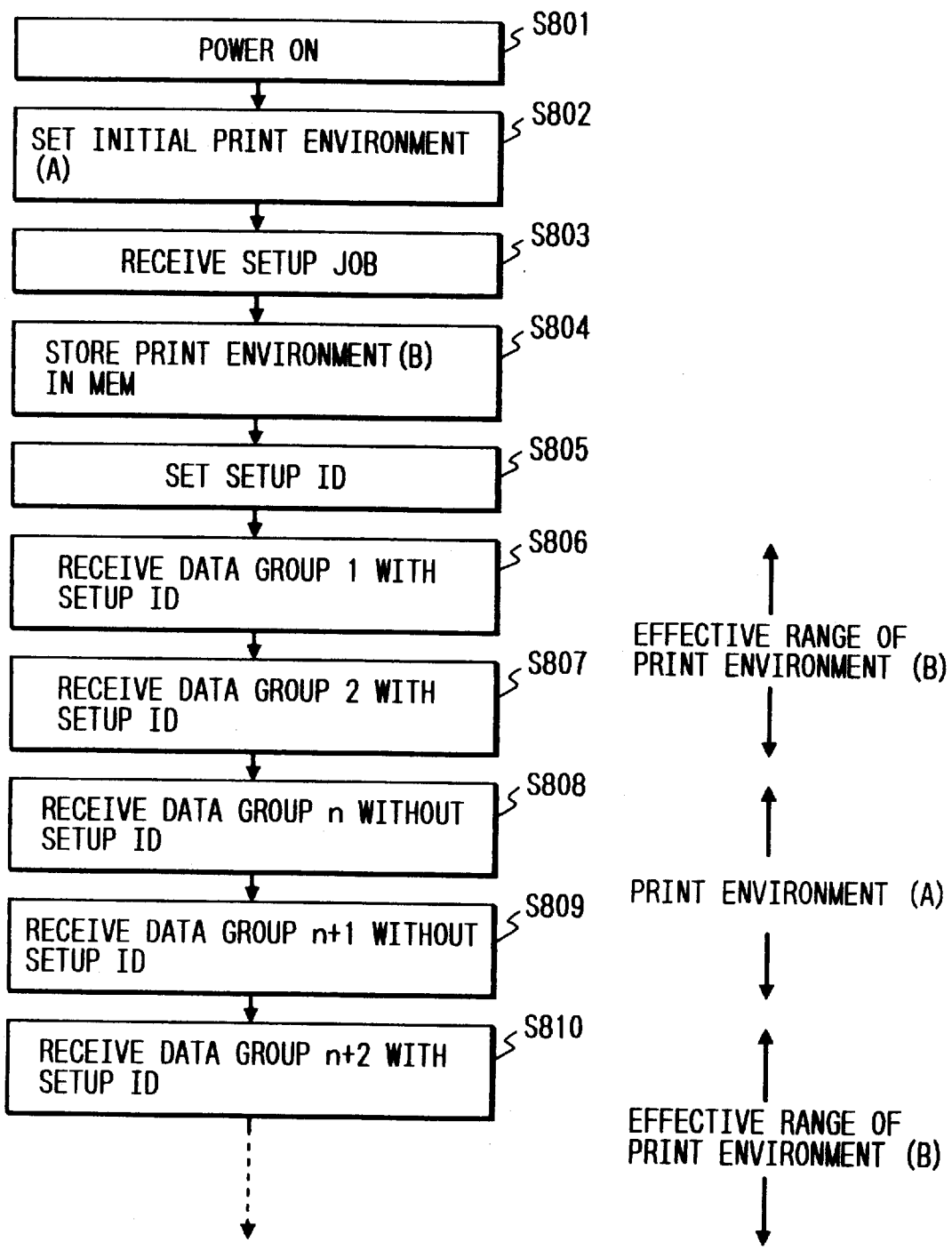

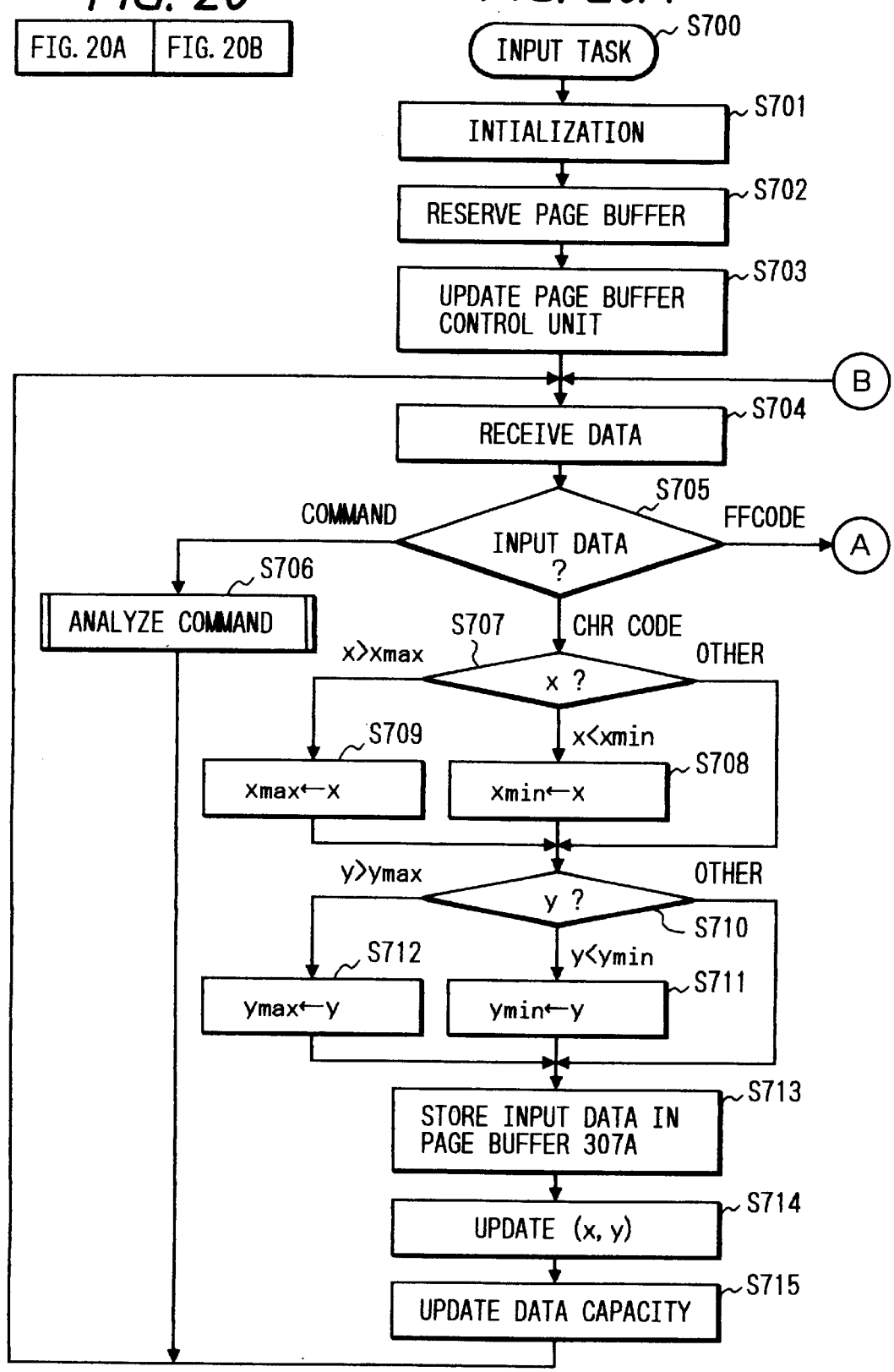

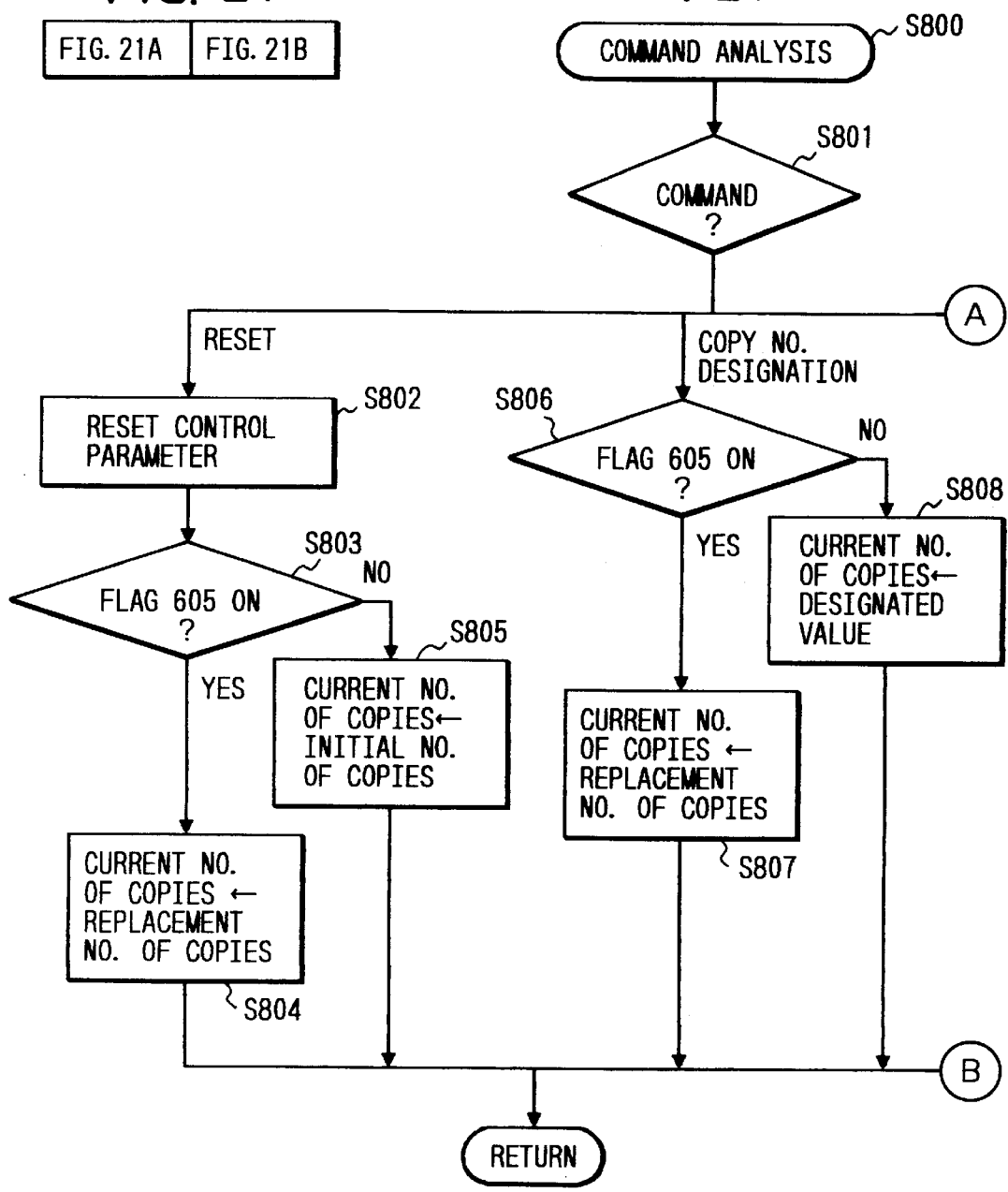

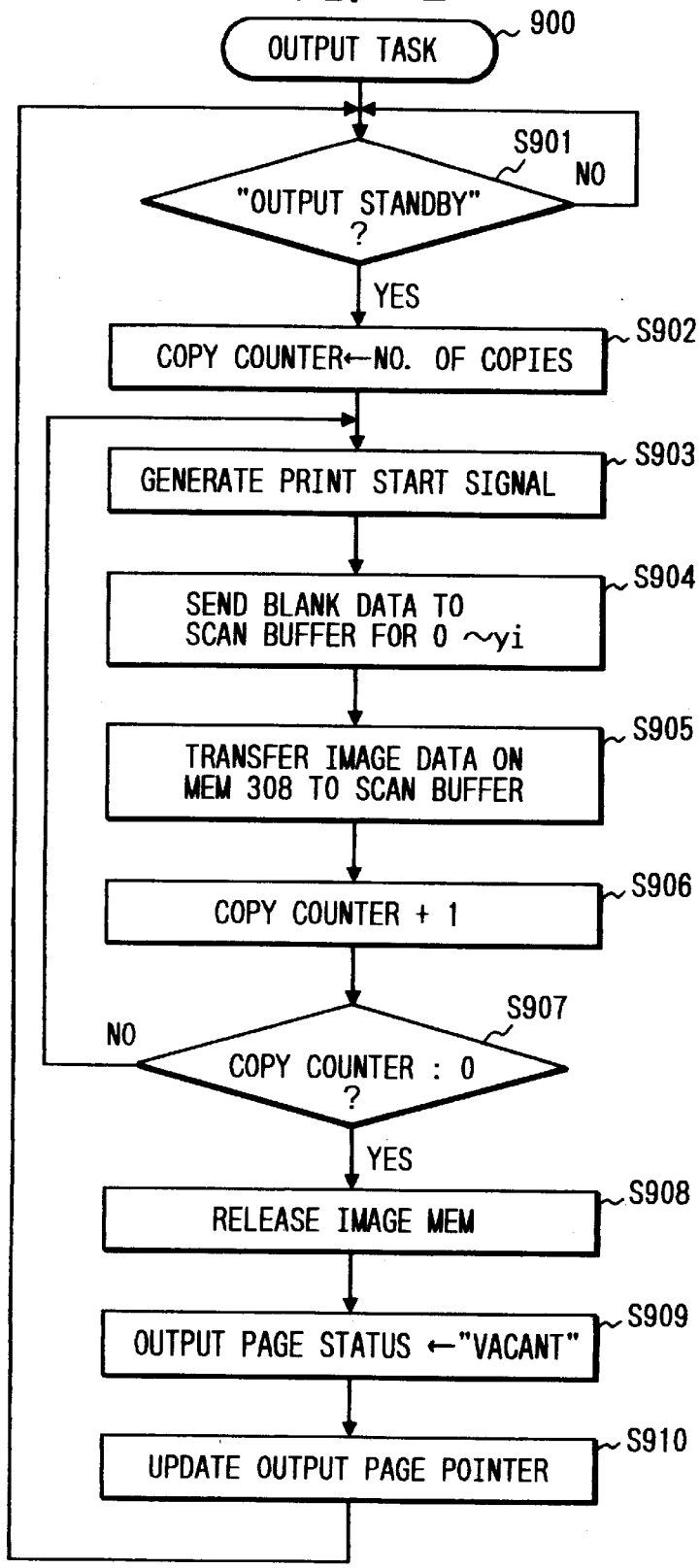

METHOD AND APPARATUS FOR PRINTING DATA IN ACCORDANCE WITH A PREVIOUSLY SET PARAMETER REGARDLESS OF CURRENTLY SPECIFIED PARAMETERS

This application is a continuation of application Ser. No. 08/083,931, filed Jun. 28, 1993, now abandoned.

BACKGROUND OF THE INVENTION

1. Field of the Invention

The present invention relates to an output method and apparatus for setting an output environment.

2. Description of the Related Art

In a prior art output apparatus of this type such as a printer, a group of commands are prepared to determine a print environment and a host computer sends those control commands to command various operations from the host computer to the printer. Examples of specific control commands are a copy count command to print the same page by a designated number of sheets, a font selection command to select a character font and a character size, a vertical and horizontal margin set command to adjust an overall position of a print area on a print image, a reduction/enlargement command to designate enlargement or reduction to print a B4 size image on an A4 size sheet, and various other commands defined for each printer. When the printer receives data from the host computer, it analyzes the data to distinguish the print data from the control command, and analyzes the type of the control command and the command parameters to execute a required operation.

In such a printer, however, one file of data is normally saved in which the control command and the print data are mixedly present and it is sent to the printer as required. A reset command is first entered to reset various control settings of the printer to eliminate an effect from a previous job and then control commands such as the destination of the number of copies are entered to define an operation to a data group to be processed. Then, a control command to change the character font or size is entered whenever required in the print data for a plurality of pages. Such data may be prepared by a user by directly entering the control command or it may be prepared as a data file on a so-called application software such as a word processor or a database software.

However, when it is required to modify the print operation in the prepared data file, it is necessary to check the print file to modify the control command or re-execute the application software to reenter the command because the control commands have been embedded in the data file.

Specific examples are to amend the number of copies of 1 set in the data file to 5 or to modify a left margin set command in order to shift the print area on the sheet to the right to leave a binding margin.

Further, when a function of the operation of the control command is expanded or a control parameter is added in a new product of the printer, the application software does not support such an additional function and the function cannot be used until the application software is versioned up.

For example, in a printer in which various fonts can be used by replacing cartridges, even if it is desired to use a new font designation in an application software of a font cartridge later marketed, the font cannot be used if it is not supported, that is, if it cannot be converted to a control command.

In order to solve the above problems, it has been proposed to reset a print environment, which is called set-up data or a set-up job. This technique is shown in FIG. 6. After power-on (S601), the printer is set to a print environment preset in an internal non-volatile memory (S602). Then, it receives a set-up job (S603) so that it is reset to a print environment designated by the set-up job (S604). This environment is valid up to data groups (1, 2, ... n) received (S605, S606, S607) until the power is re-entered (S608). For data groups received after the re-power-on (S609, S610), they are processed in the print environment stored in the non-volatile memory.

Even in such a case, when an operator using the printer sends a data group, he/she must reset the printer to the status assumed at the power-on or issue a set-up job. In an environment in which the printer is shared by more than one host device (data sources), the print environment set to one host device by the set-up job always effects to data of other host devices. In an environment in which an application program is used as a data group, a data group including a reset process must be prepared in addition to the data group of the application program in order to return the environment set up by the set-up job to the initial status.

Alternatively, a plurality of groups of print environment setting modification commands (hereinafter set-up job) for modifying the settings of the print data group may be received, and when the same environment item is set a plurality of times, the last set set-up job may be given a priority.

In this case, however, if another set-up job is issued to modify the print environment prior to the print data group including the set-up job, the setting included in the print data group is valid and the setting modification of the previously issued set-up job is useless. As a result, the setting modification to the print data including the set-up job cannot be done by the other set-up job.

SUMMARY OF THE INVENTION

It is an object of the present invention to provide an output method and apparatus for validating the setting modification of the previously issued set-up job by providing control means for prioritizing a later setting as a valid setting when selection is made a plurality of times.

It is another object of the present invention to provide an output method and apparatus which reduce a job of setting/resetting of an output environment by an operator operating data and host devices and permit an efficient job in using the output apparatus by providing means for permitting the designation of a data group which is validated by an output environment set by a set-up job and the designation of shared host devices.

It is another object of the present invention to provide an output method and apparatus which are provided with an area to store a group of control parameters defining the output operation and check means for determining whether to update by a content designated when updating is requested to the group of parameters or by a previously separately designated content to modify the operation to the data normally entered from the host computer.

It is another object of the present invention to provide an output method and apparatus which can designate that portion of control information for controlling an output operation based on the data sent from an external device, which is valid to the data and output the data relating to that portion in accordance with the control information.

It is another object of the present invention to provide an output method and apparatus which sequentially receive a plurality of types of control information for controlling the output operation based on data sent from an external device and control the output operation in accordance with the first received control information.

It is another object of the present invention to provide an output method and apparatus which store first control information for controlling an output operation based on data sent from an external device and command information for modifying the first control information to second, different, control information, and when the command information has been stored, modify the first control information to the second control information and control the output operation.

BRIEF DESCRIPTION OF THE DRAWINGS

FIG. 6 shows an example of a prior art apparatus;

FIG. 7 shows an embodiment of the present invention;

FIG. 8 shows an embodiment of the present invention;

FIG. 22 shows a flow chart of an output task of the printer control program;

DETAILED DESCRIPTION OF THE PREFERRED EMBODIMENTS

Preferred embodiments of the present invention will now be described in detail with reference to the accompanying drawings.

In the embodiments, a laser beam printer is used as a printer.

Before the description of a construction of the present embodiment, a construction of the laser beam printer used in the present embodiment is explained with reference to FIG. 1.

Figure 1:
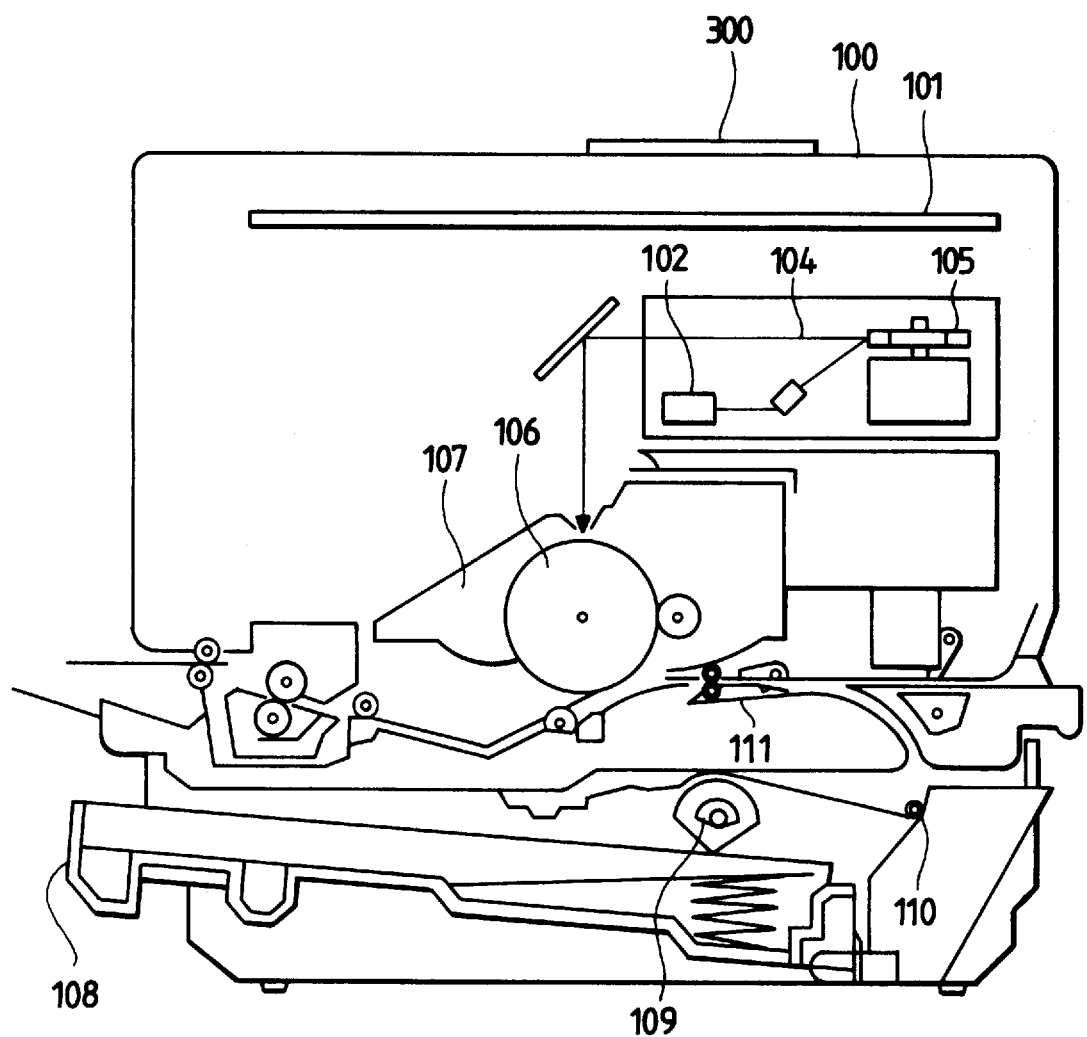
FIG. 1 shows a sectional view of an internal structure of a laser beam printer as an example of a printer of the present invention.

FIG. 1, shows a sectional view of an internal construction of the laser beam printer (hereinafter LBP) of the present embodiment. The LBP can register a character pattern and a predetermined format from a data source, not shown.

In FIG. 1, numeral 100 denotes an LBP main body which receives and stores character information (character codes), form information or macro instructions supplied from an externally connected host computer, and prepares corresponding character patterns or form patterns in accordance with the information to form an image on a record sheet which is a recording medium. Numeral 300 denotes a console panel on which manipulation switches and LED displays are arranged, and numeral 101 denotes a printer control unit which controls the overall LBP 100 and analyzes the character information supplied from the host computer. The printer control unit 101 converts the character information to a corresponding video signal and outputs it to a laser driver 102.

The laser driver 102 is a circuit for driving the semiconductor laser 103 which turns on and off a laser beam 104 emitted from a semiconductor laser 103. The laser beam is laterally swung by a rotating polygon mirror 105 to scan an electrostatic drum 106. Thus, an electrostatic latent image of the character pattern is formed on the electrostatic drum 106. The latent image is developed by a developing unit 107 arranged around the electrostatic drum 106 and then transferred to a record sheet. The record sheet is a cut sheet which is contained in a sheet cassette 108 mounted on the LBP 100 and fed into the apparatus by a sheet feed roller 109 and transport rollers 110 and 111 and fed to the electrostatic drum 106.

Figure 2:
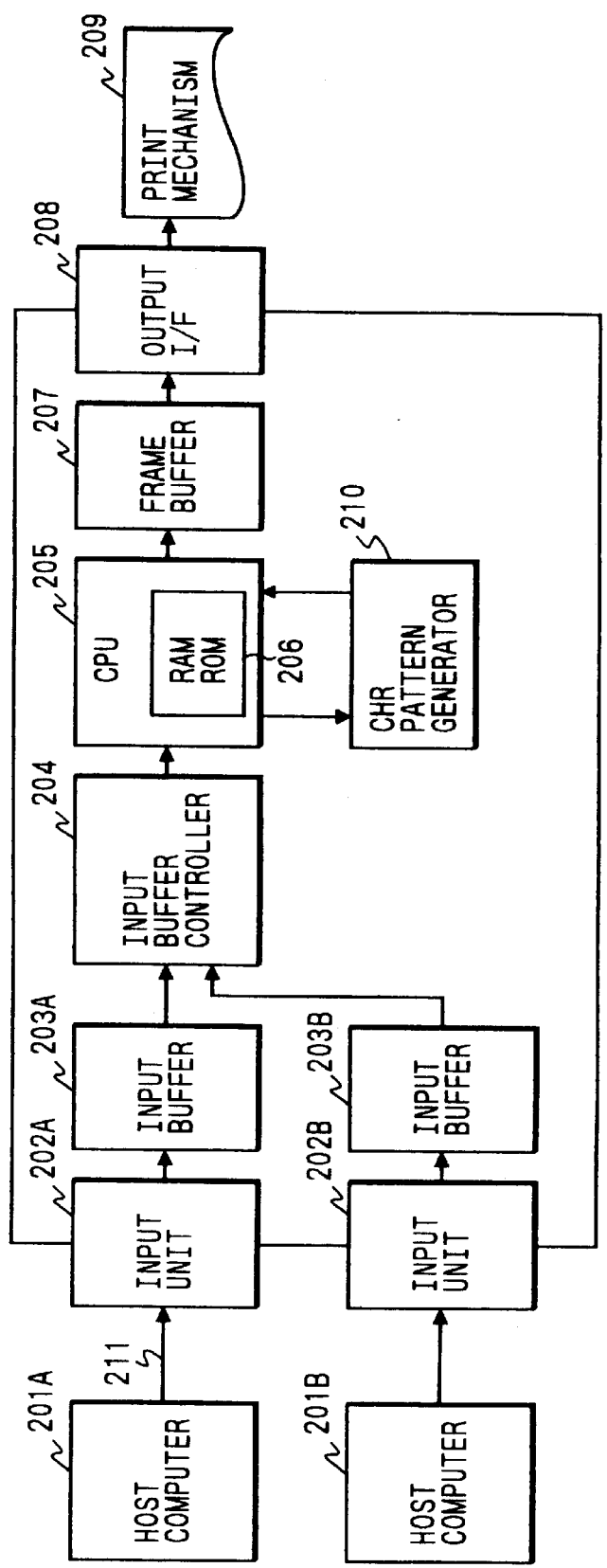
FIG. 2 shows a block diagram of a configuration of a control unit of the printer of the present invention.

FIG. 2 shows a block diagram of a configuration of a control unit of the LBP of the present invention.

The control unit of the LBP receives information 211 including the character codes, the external character font or form information and the macro registration information sent from host computers 201A and 201B which are sources of image information and controls to print out the document information page by page.

Numeral 202 denotes input means for receiving various information from the host computers 201, and numeral 203 denotes receiving buffers for temporarily storing the various input information.

In the present embodiment, two sets of input means and the receiving buffers (202A, 203A, 202B and 203B) are provided so that they may be connected to the two host computers 201A and 201B.

Numeral 210 denotes a character pattern generator which comprises a ROM for storing the pattern information corresponding to the character code and a read control circuit therefor, and it also has a code conversion function for calculating an address of the character pattern corresponding to the input character code.

Numeral 205 denotes a CPU for controlling the overall control unit of the LBP and it controls the overall apparatus by a control program of the CPU 205. A RAM is also provided to secure a work area for storing flags indicating a first prioritization or a later prioritization used in steps (8) and (10) of FIG. 12 to be described later and for executing various processes.

Numeral 207 denotes a frame buffer which stores at least one page of pattern information of the print image developed into the character patterns. Numeral 208 denotes an output interface unit which generates a video signal corresponding to the pattern information from the frame buffer 207 and executes the interface control to a print unit 209 which receives the video signal from the output interface unit 208 and prints out the image signal in accordance with the video signal.

The CPU 205 receives a print data group having an information field for designating a print environment from the host computer and analyzes it.

Figure 11A:
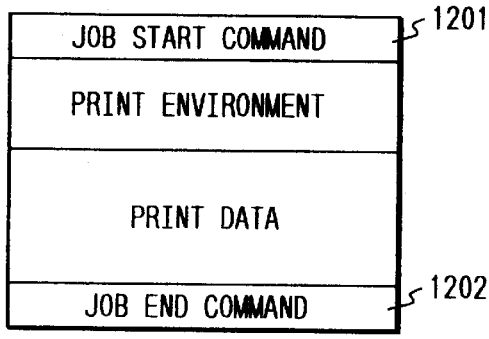
FIGS. 11A and 11B show a print data group.
Figure 11B:
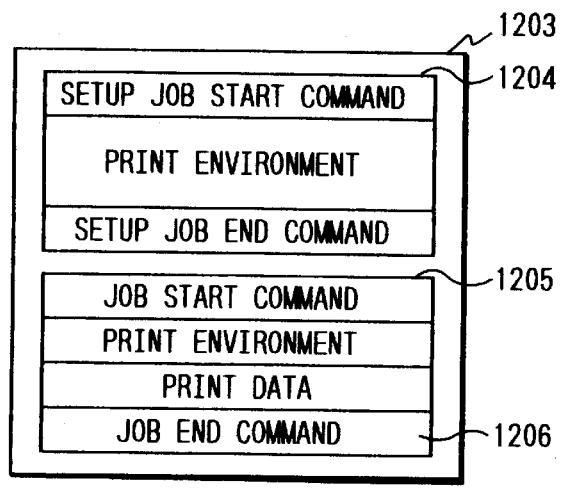

A job is illustrated in FIGS. 11A and 11B. FIG. 11A shows a data group which starts by a start of job command 1201 which is a control command to the printer and ends by an end of job command 1202. A set-up job 1204 of FIG. 11B is used to modify the print environment information of the job. Numeral 1205 denotes the start of job command and numeral 1206 denotes the end of job command.

<First Embodiment (which determines a valid range of the set-up job)>

Figure 3:
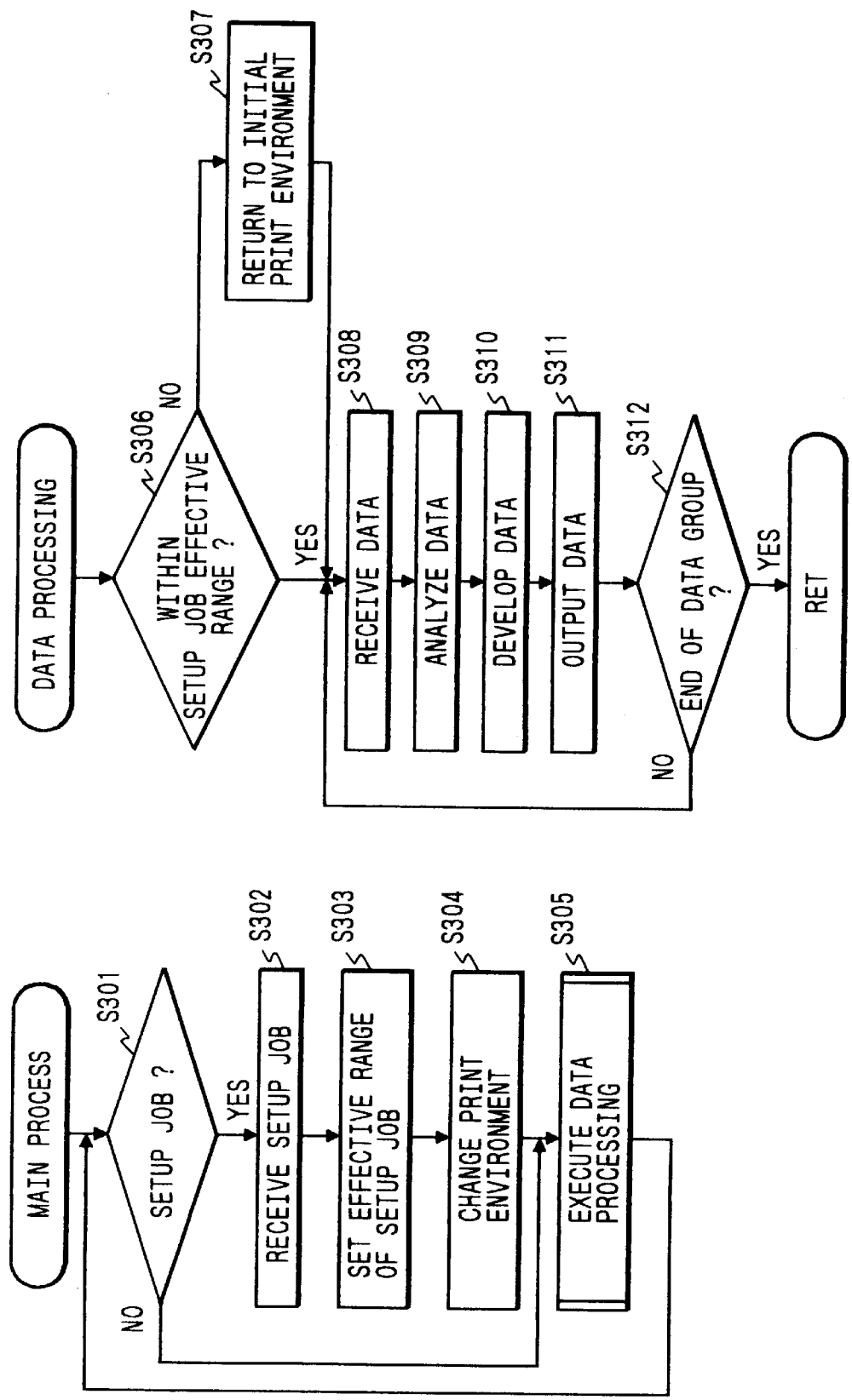
FIG. 3 shows a flow chart of an embodiment of the present invention.

FIG. 3 shows a flow chart of an embodiment of the present invention.

The present embodiment is now explained with reference to FIG. 3.

The printer 100 executes the following internal operation in accordance with the control of the ROM 206.

The printer first determines whether the received data is a set-up job or not (step S301). If it is not the set-up job, it processes the data in the print environment present at the power-on (step S305). If it is the set-up job, it executes a set-up job reception process (step S302) to set a valid range of the set-up job (for example, it sets the number of valid data into a counter) (step S303). Then, it sets the print environment to the one designated by the set-up job (step S304) and executes the processing of the received data in that print environment (step S305). A data processing unit determines whether it is in the valid range of the set-up job or not (for example, the count set in S303 is decremented) (step S306), and if it is in the valid range, it executes the reception process (step S308), the analysis process (S309), the development process (S310) and the output process (S311), and when the end of data is reached (step S312), the process returns to a main process. In the step S306, if it is out of the valid range of the set-up job (the count is zero), the print environment is returned to the initial one and the process is started from the step S308.

A specific example of the present embodiment is now explained with reference to FIG. 7.

In FIG. 7, the valid range of the set-up job is up to n-th data group. At the power-on (S701), the printer is set to the print environment (the print environment A) stored in the non-volatile memory in the apparatus (S702). When it receives the set-up job (S703), it is set to the print environment designated by the set-up job (S704) and the valid range (n-th job) in which that print environment is valid is set. The printer prints out up to the data group 1 (S705), the data group 2 (S706) . . . the data group n (S707) and then it returns the environment to the print environment A (S708) and processes the data group (n+1) (S709) and the data group (n+2) (S710). The subsequent data groups are processed in the print environment A.

In the present embodiment, the initial print environment may be either:

an environment present immediately before the reception of the set-up job, or a print environment at the power-on.

<Modification 1 of Embodiment 1>

Figure 4:
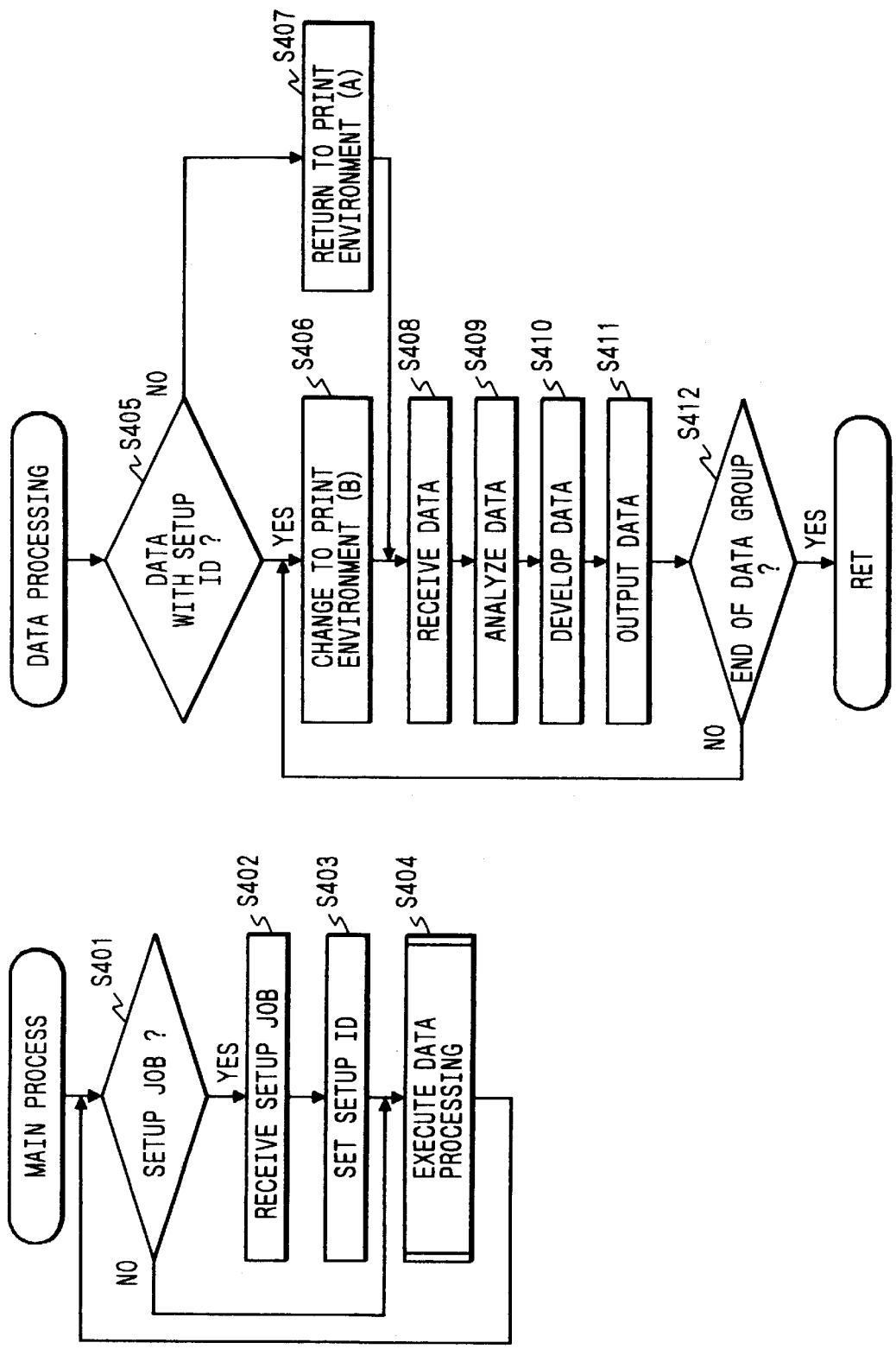
FIG. 4 shows a flow chart of an embodiment of the present invention.

In the above embodiment, the valid range of the print environment (print environment B) designated by the set-up job is designated by the number of data groups. Alternatively, as shown in a flow chart of FIG. 4, the data group which validates the set-up job may be added with an ID number (set-up ID) and it may be detected to switch between the print environment present at the power-on (the print environment A) and the print environment B, the printer first determines whether the received data is the set-up job or not (step S401). If it is not the set-up job, it processes the data in the print environment present at the power-on (step S404). If it is the set-up job, it executes the set-up reception process (step S402), sets the valid data ID of the set-up job (step S403), and processes the received data group (step S404). The data processing unit determines whether the received data is the set-up job valid data or not by the ID (step S405), and if it is the data group having the valid ID, it modifies the print environment to the environment designated by the set-up job (step S406), receives the data (step S408), analyzes the data (step S409), develops the data (step S410) and outputs it (step S411). When the end of data is reached (step S412), the process returns to the main process. In the step S405, if it is not the data group having the valid ID of the set-up job, it returns the print environment to the initial one (step S407) and executes the process from the step S708.

Figure 9A:
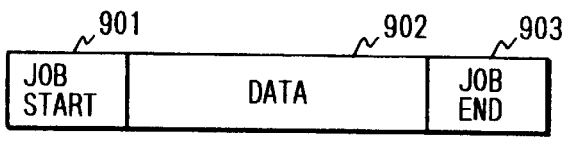
FIGS. 9A and 9B show formats of a data group used in the present invention.
Figure 9B:
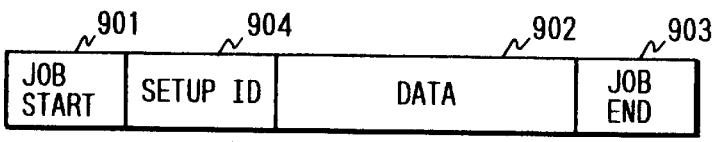

FIG. 9B shows an example in which an ID which validates the print environment B to the data group. As shown in FIG. 9A, the data group usually comprises a command indicating the beginning of the data group (job beginning) 901, real data 902, and a command indicating the end of the data (job end) 903. In the present embodiment, a set-up ID 904 is inserted between the job start and the real data to enable the switching between the print environment A and the print environment B.

In FIG. 8, the data groups 1, 2 and (n+2) are the data groups having the valid ID of the set-up job. At the power-on, the printer is set to the print environment (the print environment A) stored in the non-volatile memory in the apparatus (step S802). When it receives the set-up job (step S803), it stores the print environment (the print environment B) designated by the set-up job in the memory of the printer (step S804) and sets a set-up ID which invalidates that environment (step S805). The printer changes the print environment to the print environment B for the data groups 1 (step S806), 2 (step S807), . . . (n+2) (step S810) and prints out the data in that environment. For the data groups n (step S808) and (n+1) (step S809), it switches the print environment to the print environment A and prints out the data in that environment.

<Modification 2 of Embodiment 1>

Figure 5:
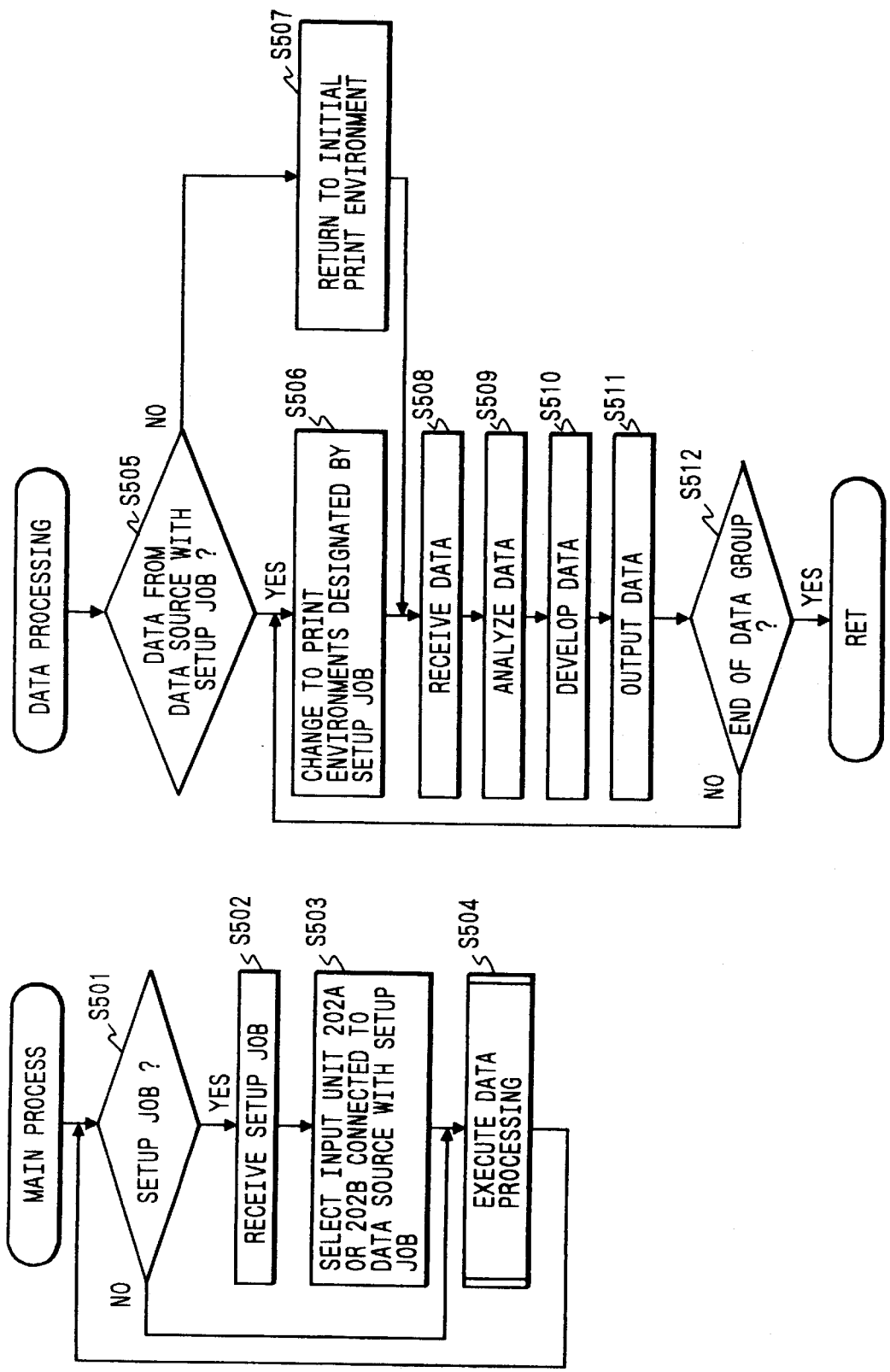
FIG. 5 shows a flow chart of an embodiment of the present invention.

In the above embodiment, the data groups are sent from one host device. It is now assumed that more than one host device are connected to different input means 202A and 202B. As shown in a flow chart of FIG. 5, the data group which invalidates the set-up job may be determined in addition to the above embodiment to switch the print environment. The printer first determines whether the received data is the set-up job or not (step S501). If it is not the set-up job, it processes the data in the print environment present at the power-on (step S504). If it is the set-up job, it executes the set-up reception process (step S502) and sets one of the input means 202A and 202B shown in FIG. 2 to which the validated host device is connected (step S503). Then, it processes the received data groups (step S504). The data processing unit determines whether the received data is the data group from the input means which is valid to the set-up job or not (step S505), and if it is the data group from the valid input means, it modifies the print environment to the environment designated by the set-up job (step S506), receives the data (step S508), analyzes the data (step S509), develops the data (step S510) and outputs it (step S511). When the end of data is reached (step S512), it returns to the main process, In the step S505, if it is not the data group from the input means which is valid to the set-up job, it returns the print environment to the initial one (step S507) and executes the process from the step S508.

Figure 10:
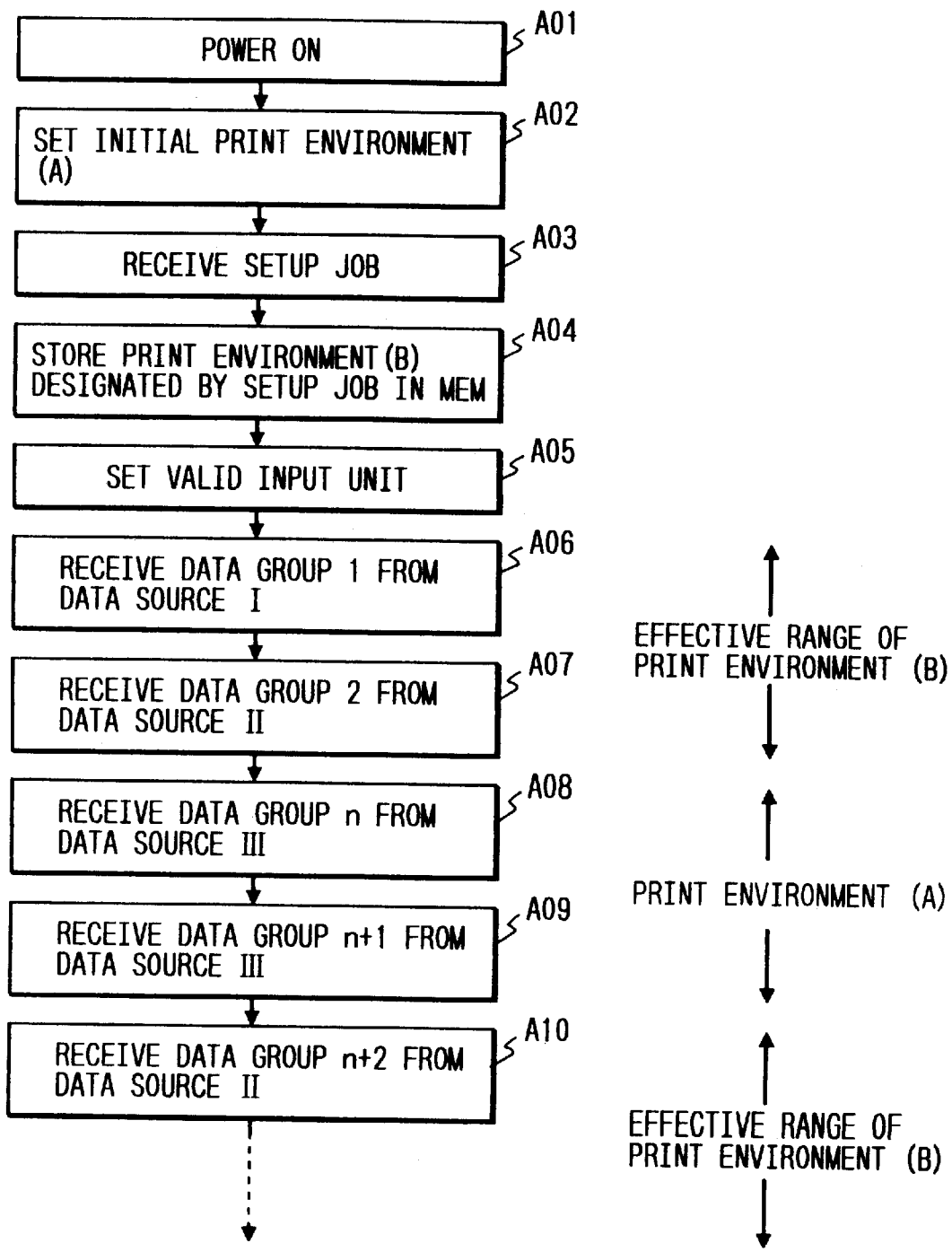
FIG. 10 shows an embodiment of the present invention.

In FIG. 10, the devices connected to the input means of the valid print environment set by the set-up job are a host device I and a host device II, and an invalid device is a host device III. At the power-on (step A01), the printer is set to the print environment (the print environment A) stored in the non-volatile memory in the apparatus (step A02). When it receives the set-up job (step A03), it stores the print environment (the print environment B) designated by the set-up job in the memory in the printer (step A04), and sets the input means which invalidates that environment (step A05). The printer switches the print environment to the print environment B for the data group 1 (step A06), the data group 2 (step A07) and the data group (n+2) (step A10) from the input means which is valid to the set-up job, and prints out the data in that environment. For the data groups n (step A08) and (n+1) (step A09), the print environment is switched to the print environment A and the data is printed out in that environment.

As described above, the input unit for receiving the data supplied from the host device, the receiving buffer for storing the input data, the analyzing unit for analyzing the received data, the page buffer memory for storing the analyzed information, the development unit for developing the information in the page buffer into the frame buffer memory and the print unit for printing out the data on the frame buffer are provided, and the range of the data group which invalidates the print environment set by the specific command group (the set-up job) which is different from the normal print environment setting command, for the data group received after the reception of the set-up job can be designated.

As described above, in the printer which can modify the print environment by the specific command group, the following advantages are brought.

(1) Only one setting is needed for the data group which requires the same print environment by invalidating the specific print environment for a predetermined period as shown in the Embodiment 1. Further, since the print environment is automatically returned to the initial environment, there is no affect to other operators.

(2) The specific print environment is validated to any data group once it is set as shown in the Embodiments 2 and 3. Accordingly, the validation and the invalidation of the print environment can be efficiently attained.

<Modification 3 of Embodiment 1—Selection for Prioritizing later one>

An embodiment for designating the prioritization of a later set-up job is now explained. The validity setting selection of the set-up job by the CPU 205 is done by a flag. When the set-up job is received, the validity setting selection means sets that flag. Thereafter, while the flag is set, the setting by the later received set-up job is neglected. The flag is reset by the end of job command in the job of FIG. 2. Thus, the next set-up job is validated.

An embodiment of the print process of the present invention is now explained with reference to FIG. 12.

Figure 12:
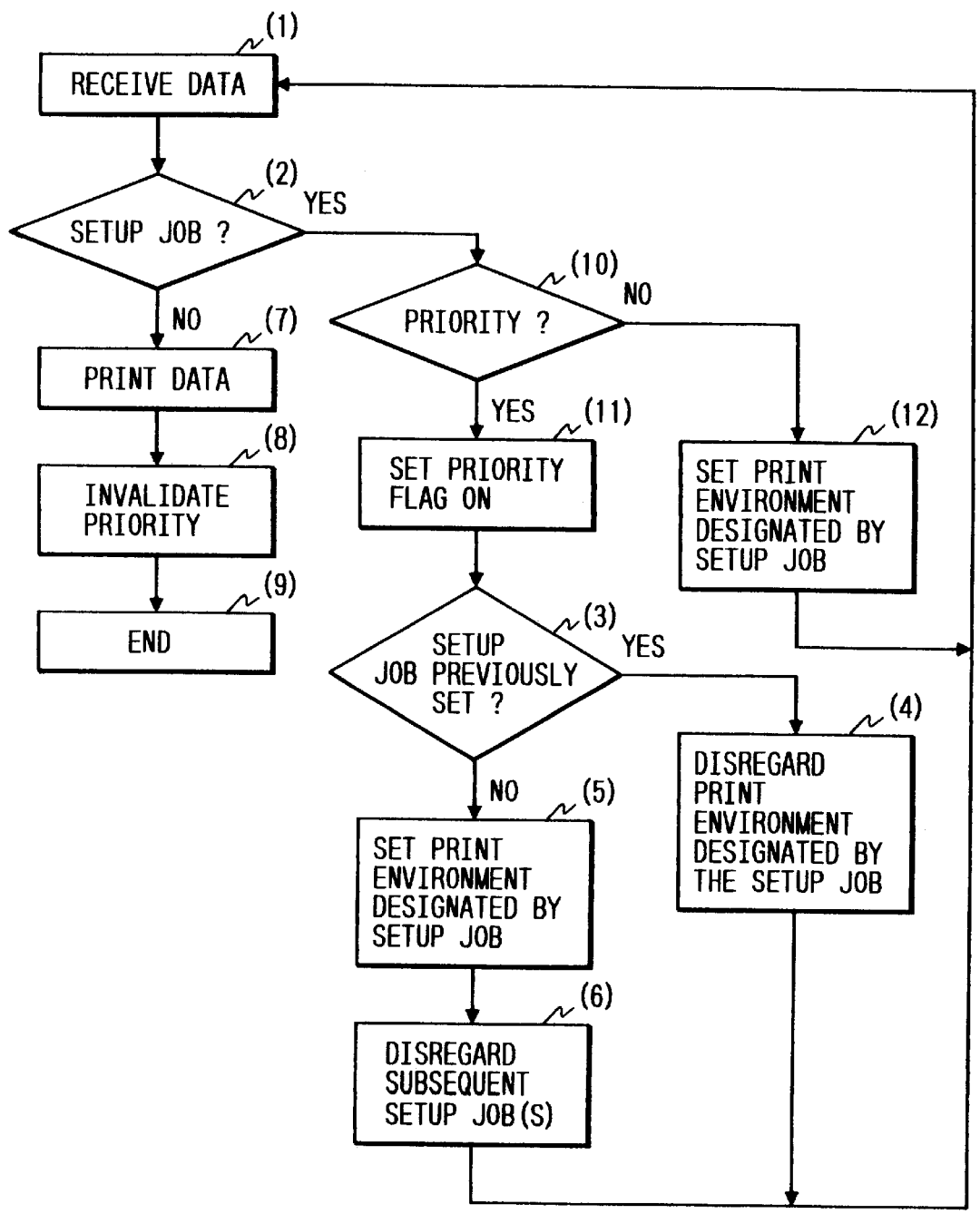
FIG. 12 shows a print process.

FIG. 12 shows a flow chart of the print process of the present invention. Numerals (1) to (9) denote steps.

In a step (1), the set-up data and the print data are transferred from the host computer 201A or 201B and they are received through the input means 202A and 202B as shown in FIG. 2. Whether the data sent from the CPU 205 is the set-up data or not is determined in a step (2). In a step (10), whether the prioritization a first one has been set or not is determined based on the information in the print environment information unit shown in FIG. 11B, and if the decision is YES, that is, if the prioritization to the first one has been set, the process proceeds to a step (11).

In the step (11), if a flag to indicate the prioritization to the first one is in a reset status, it is set. Then, the process proceeds to a step (3). In the step (3), whether the set-up job has been set or not is determined.

Since the set-up job has not been set for the first time, the print environment setting information of the received set-up job is set (step (5)).

However, since the flag of the prioritization for the first one was set in the step (11), the subsequent set-up job is ignored (step (6)).

If it is determined in the step (2) that a set-up job has been transferred and in the step (10) that the prioritization to the first one has been set, the process proceeds to a step (4) if the set-up job has been set in the step (3) and the print environment setting information of that set-up job is ignored (step (4)).

When the job is received in the step (1) and it is determined as the print data in the step (2), the print process is executed in the preset print environment (step (7)).

When an end of job command indicating the end of the print data group is received, the flag of the prioritization to the first one is reset to release the prioritization to the first one (step (8)).

The print process is terminated (step (9)). If it is determined in the step (10) that the prioritization to the first one has not been set, the proceeds to a step (12) to set the value of the set-up job.

In this manner, when a plurality of set-up jobs are set, the first setting is prioritized.

<Other Embodiment>

In the above embodiment, if the set-up job has been previously set in the step (6), all of the subsequent set-up jobs are unconditionally invalidated. Alternatively, for the items not set by the previous set-up job, the subsequently received set-up jobs may be set.

By including the priority information in the set-up job, it is possible to not only prioritize the previously entered set-up job but also prioritize any set-up job.

Further, by assigning the priority order to the priority information, it is possible to more finely designate the priority.

By imparting the priority information for each print environment setting item, it is possible to validate the setting of the later received set-up job or the setting of the job rather than the setting of the first received set-up job.. For example, the priority information which imparts the priority in the order of 1, 2 and 3 is imparted to each print environment setting command. When it is desired to change the font of the text for each print by the set-up job without changing the font of the heading in the print data, the priority order for the heading font setting command is set to 1, the priority order of the font setting command of the previously received set-up job is set to 2, and the priority order of the text font setting command is set to 3. Since the priority order of the setting command of the set-up job is 2, it has a higher priority than that text font setting command which has the priority order 3 and the text font is changed by the set-up job, but since the priority order of the heading font setting command is 1 which is higher than that of the set-up job, the font setting of the set-up job is ignored and the heading font is not changed. In this manner, only the text font is changed by the set-up job without changing the heading font.

As described above, by the control means which prioritizes the previous setting when the same print environment setting is made, the print environment may be changed by adding the set-up job at the beginning without updating the print environment setting in the document data group comprising the set-up job and the job. As a result, the print environment can be changed by using the new set-up job even in the print data group in which the set-up job and the job are combined in unity such as the print data group outputted by an existing application program.

Figure 13:
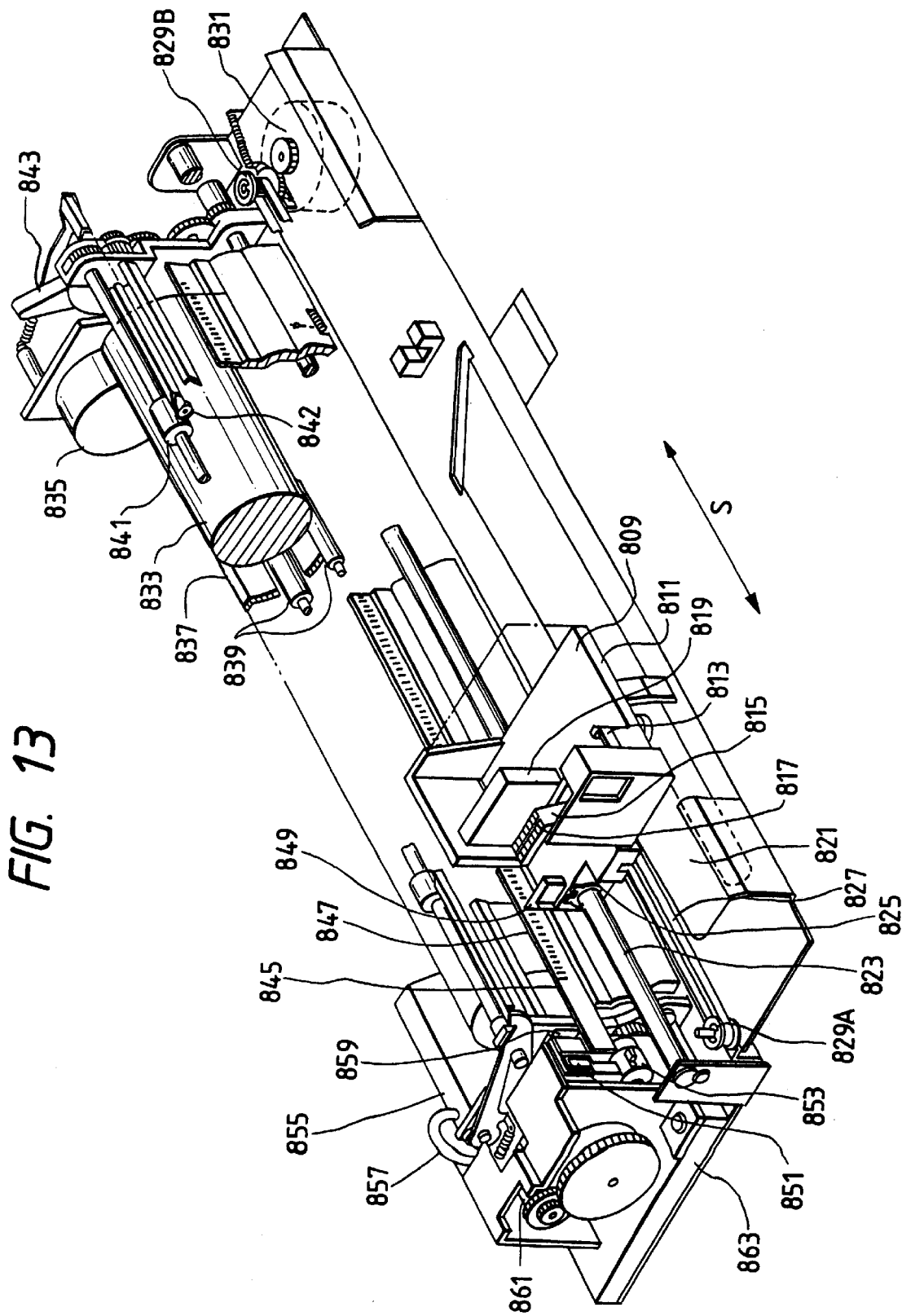
FIG. 13 shows an internal structure of a thermal jet printer as an example of the present invention.

FIG. 13 shows a construction of a thermal jet printer which uses bubbles.

Numeral 809 denotes a head cartridge having an ink jet recording head, numeral 811 denotes a carriage for mounting the head cartridge 809 to scan it in the direction S, numeral 813 denotes a hook to which the head cartridge 809 is attached, and numeral 815 denotes a lever for manipulating the hook 813. A marker 817 which indicates a scale formed on a cover to be described later to enable to read a print position and a setting position is formed on the lever 815. Numeral 819 denotes a support plate which supports an electric connector to the head cartridge 809 and numeral 821 denotes a flexible cable for connecting the electrical connector to a control unit of a main body.

Numeral 823 denotes a guide shaft for guiding the carriage 811 in the direction S. It is fit to a bearing 825 of the carriage 811. Numeral 827 denotes a timing belt to which the carriage is secured and which drives it in the direction S and is spanned across pulleys 829A and 829B arranged at the opposite sides of the apparatus. A driving force is transmitted to one pulley 829B from a carriage motor 831 through a transmission mechanism such as gears.

Numeral 823 denotes a platen roller which controls a record plane of a recording medium such as a sheet (a record sheet) and transports it and it is driven by a transport motor 835. Numeral 837 denotes a paper pan which is arranged in the course of the feed path of the recording medium to urge the recording medium to the platen roller 833 and transports it. Numeral 841 denotes an eject roller for ejecting the recording medium toward an eject port, not shown. Numeral 842 denotes a spur provided for the eject roller 841 and it pushes the roller 841 through the recording medium to cause a transport force of the recording medium by the eject roller 841. Numeral 843 denotes a release lever for deactivating the feed roller 839, a retainer plate 845 and the spur 842 in setting the recording media.

Numeral 845 denotes a retainer plate for suppressing the float of the recording media in the vicinity of the recording position and securing the close contact to the platen roller 833. In the present embodiment, an ink jet recording head which discharges ink is used as the recording head. Accordingly, the distance between the ink discharge port formation plane of the recording head and the recording plane of the recording medium is very small and the gap therebetween must be strictly controlled to avoid the contact of the recording medium and the discharge port formation plane, to this end, the arrangement of the retainer plate is effective. Numeral 847 denotes a scale formed on the retainer plate 845, and numeral 849 denotes a marker formed on the carriage to correspond to the scale. It is possible to read the print position and the set position of the recording head by the scale and marker.

Numeral 851 denotes a cap made of an elastic material such as rubber which faces the ink discharge port formation plane of the recording head at a home position. The cap 851 is used to protect the recording head in a non-recording state and in a discharge recovery process of the recording head. In the discharge recovery process, an energy generating element arrange in the ink discharge port and used for discharging the ink is driven to discharge the ink from all discharge ports so that the factors which disturb the discharge such as air bubbles, dust and viscodized ink which no longer can be used for printing are removed (preliminary discharge) or the ink is forcibly ejected from the discharge port to remove the factors which disturb the discharge.

Numeral 853 denotes a pump which applies a suction force and sucks the ink accommodated in the cap 851 in the discharge recovery process by the forced ejection or the discharge recovery process by the preliminary discharge. Numeral, 855 denotes an exhausted ink tank for storing the exhausted ink sucked by the pump 853, and numeral 857 denotes a tube for connecting the exhausted ink tank 855 and the pump 853.

Numeral 859 denotes a blade for wiping the discharge port formation plane of the recording head and it is movably supported to move to a position projecting to the recording head to wipe during the movement of the head and a retracted position at which it does not engage with the discharge port formation plane. Numeral 861 denotes a recovery system motor and numeral 863 denotes a cam device for driving the pump 853 and moving the cap 851 and the blade 859 by the transmission of a motive force from the recovery system motor 861.

In accordance with the present invention, output method and apparatus which can indicate that portion of the control information for controlling the output operation based on the data sent from the external device which is effective to the data and conduct the output operation based on the data of that portion in accordance with the control information are provided.

In accordance with the present invention, output method and apparatus which sequentially receive a plurality of types of control information for controlling the output operation based on the data sent from the external device and control the output operation in accordance with the first received control information are provided.

<Embodiment 2>

A second embodiment of the present invention is now explained in detail with reference to the drawings.

Figure 14:
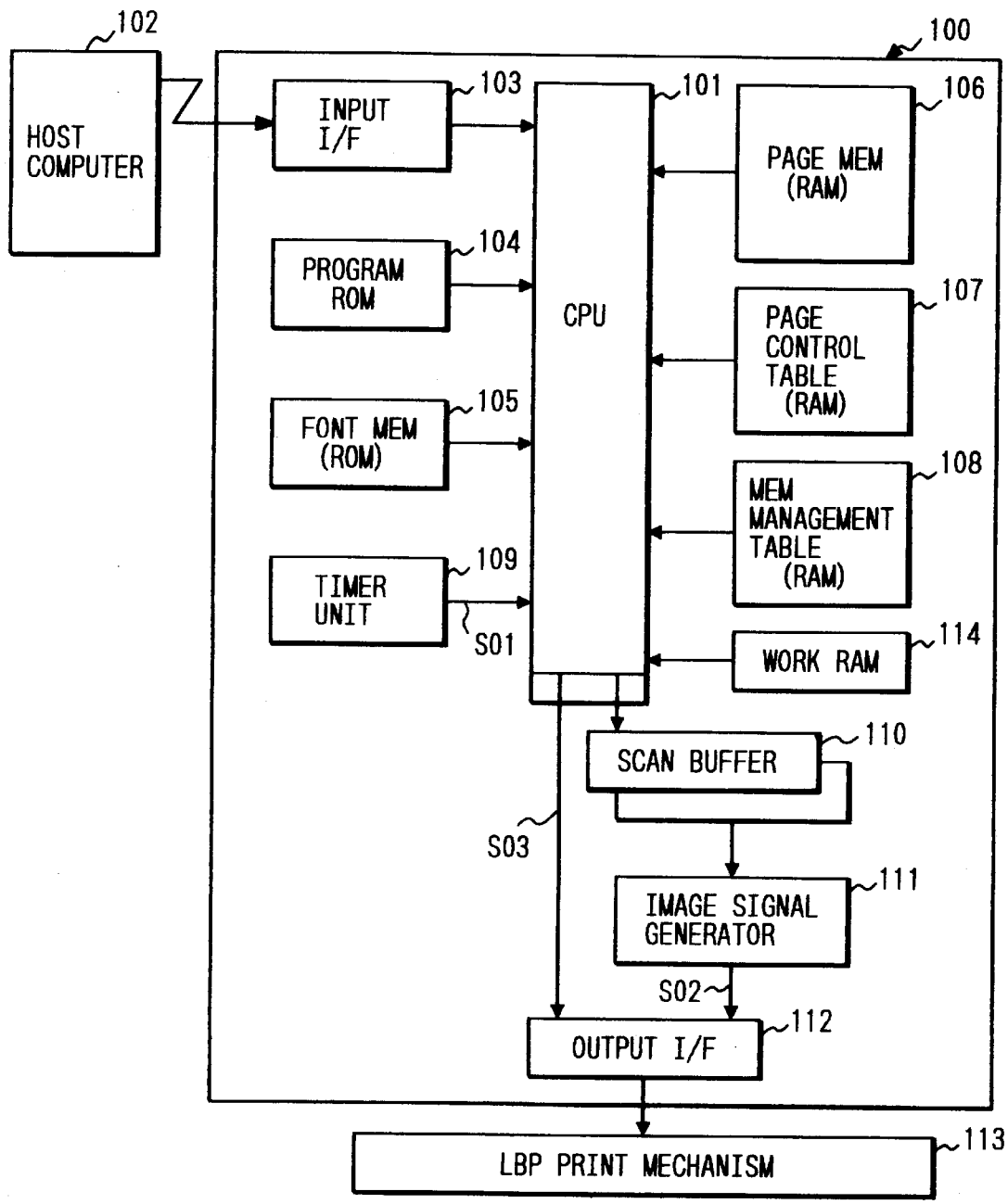
FIG. 14 shows a block diagram of a printer control unit of a laser beam printer of an embodiment.
Figure 15:
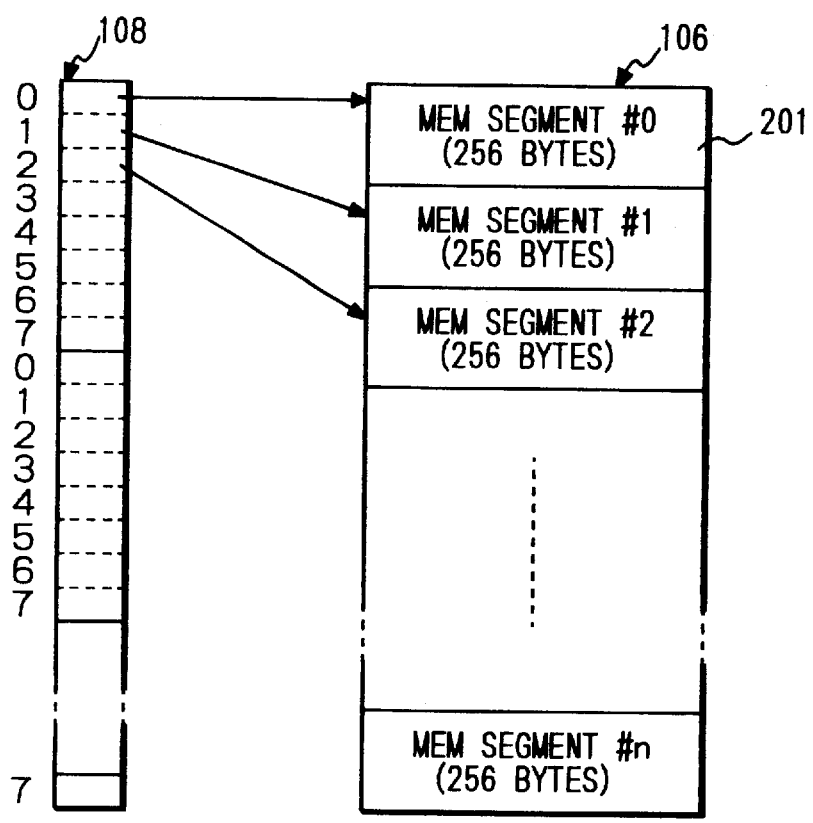
FIG. 15 shows a table structure of a memory control table on the printer control unit.

FIG. 14 shows a block diagram of a configuration of a printer control unit 100 of a laser beam printer (hereinafter an LBP) in the embodiment of the present invention. In FIG. 14, numeral 101 denotes a CPU for controlling the overall LBP and analyzing input data, numeral 103 denotes an input interface circuit for receiving data sent from a host computer 102 and conveying it to the CPU 101, numeral 104 denotes a program ROM for storing a printer control program of the CPU 101 shown in FIGS. 20A to 22 to be described later and a reset value table shown in FIG. 18, numeral 105 denotes a font memory which stores character patterns corresponding to character codes in the data inputted from the host computer 102 and which is a conventional ROM, numeral 106 denotes a page memory which is used for temporarily saving data from the host computer and to secure an image memory of a plurality of pages and whose use status is controlled by a memory control table 108 to be described later, numeral 107 denotes a page control table which controls the input and output of a page buffer on the page memory and the image memory and whose construction will be explained later with reference to FIG. 16, and numeral 108 denotes a memory control table which controls the use status of the page memory 106 to secure and release the memory and whose construction is shown in FIG. 15. The page memory 106, the page control table 107 and the memory control table 108 are constructed in a conventional RAM. Numeral 109 denotes a timer unit for outputting a timer interruption signal S01 to the CPU 101 at a period of 50 ms. The timer interruption signal S01 starts a timer interruption process routine of the printer control program of a multi-task processing system built in the CPU 101 to control the task. Numeral 110 denotes a scan buffer constructed by a static RAM for temporarily saving one laser scan of data on the image memory secured on the page memory 106. The scan buffer 110 is of dual buffer structure so that while the CPU 101 writes the image buffer on the page memory 106 into one scan buffer 110, the image signal of the other buffer is read by an image signal generator 111 and it is converted to an image signal S02 which is outputted to an output interface circuit 112.

The output interface circuit 112 outputs various control signals and the image signal to an LBP print unit 113, which is started by a printer start signal S03 from the CPU 101 so that a series of control processes such as sheet feed, transfer of an image to the sheet and fixing are conducted.

Figure 19:
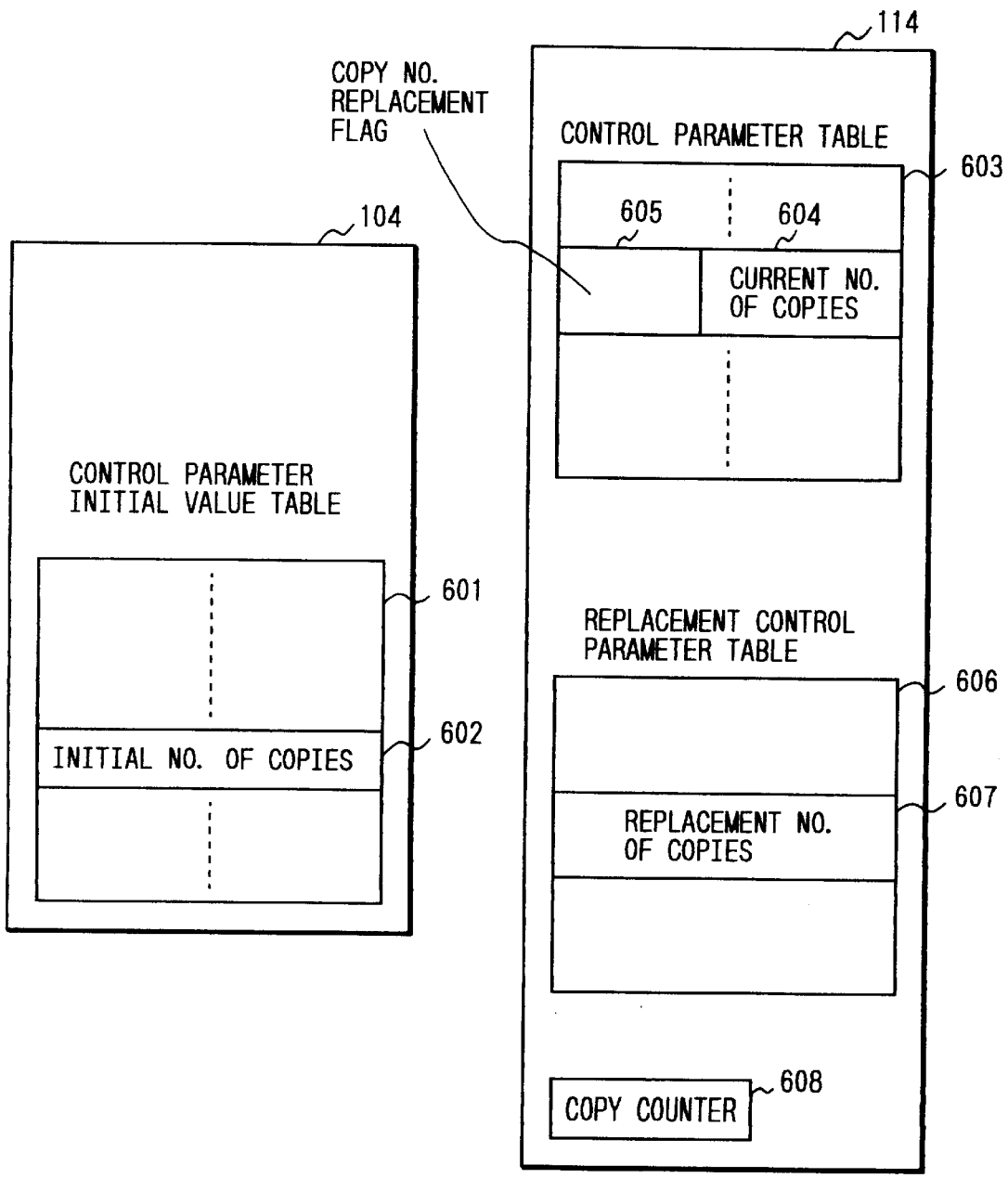
FIG. 19 shows a data structure of a control parameter.

Numeral 114 denotes a work RAM area to be used by the printer control program shown in FIGS. 20A to 22 and it defines various control parameters and flags. A structure thereof is shown in FIG. 19 to be described later.

Referring to FIG. 15, a control method of the page memory 106 using the memory control table 108 of FIG. 14 is explained. The page memory 106 is logically segmented to memory segments of 256 bytes and each of them is associated with one bit of the RAM of the memory control table 108, which is constructed by a conventional RAM which accesses byte by byte (8 bits). A bit m of the first byte corresponds to the {8×(1−1) +m}th memory segment of the page memory 106 counted from the head so that the RAM address can be readily calculated. For each bit on the memory control table 108, if it is "1", it represents that the corresponding memory segment is in use, and if it is "0", it represents non-use. Thus, the CPU 101 can grasp the use status of the memory and secure a vacant memory segment.

Figure 16:
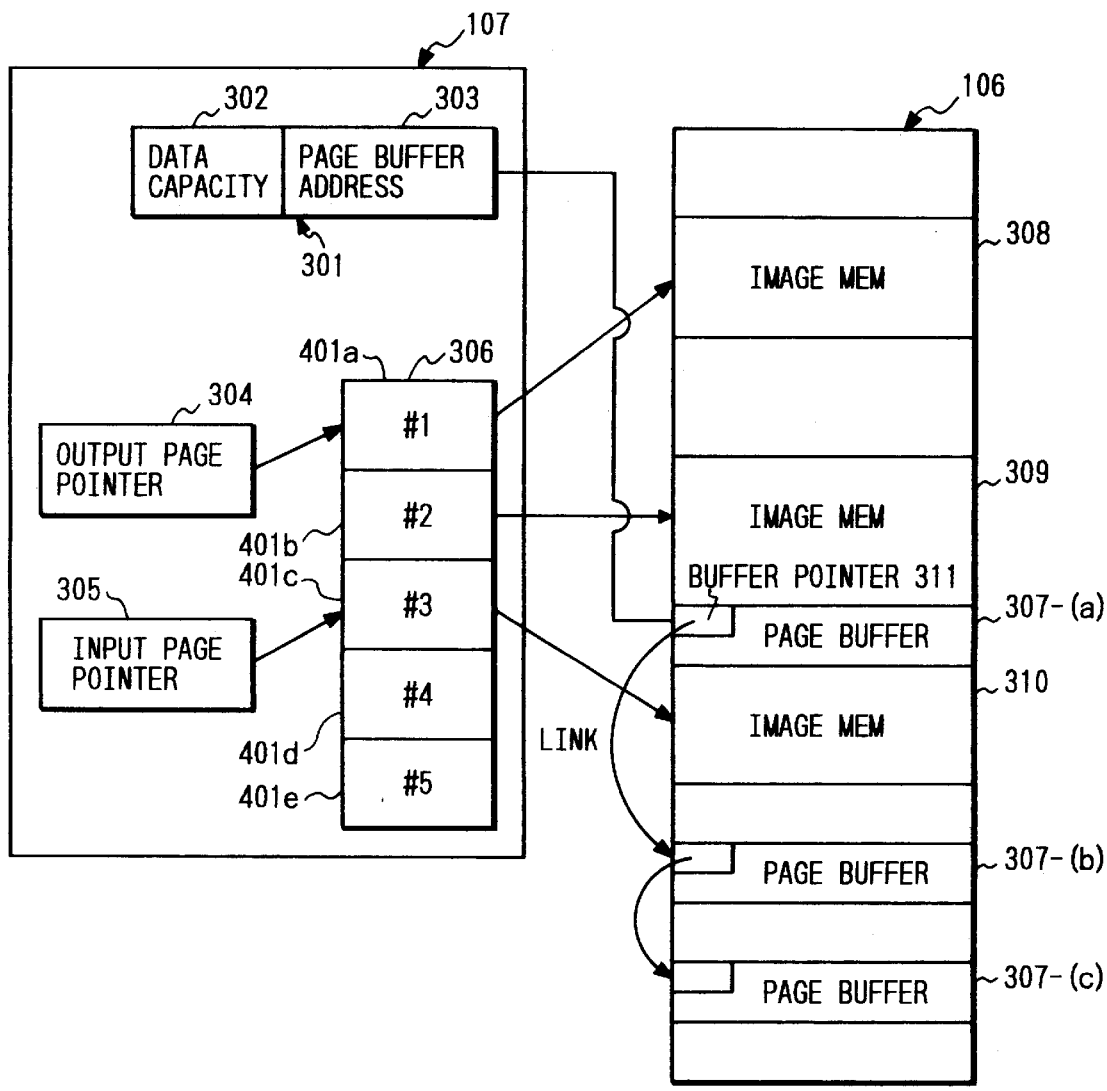
FIG. 16 shows a table structure of a page control table on the printer control unit.

FIG. 16 shows an internal structure of the page control table 107. Numeral 301 denotes a page buffer control unit which comprises a page buffer address area 303 for storing a head address of the page buffer 307 secured on the page memory 106 and a data volume area for storing a data volume stored on the page buffer 307. The page buffer 307 checks the vacancy by the memory control table 108 to secure a required area and temporarily saves one page of input data supplied through the input interface circuit 103.

The page memory 106 can secure, in addition to the page buffer 307, a plurality of image memories 308 to 310 which generate one page of output image in a form of dot pattern and hold it. It sequentially generates the output image to the image memory each time one page of data is inputted to the page buffer 307, to control the input and output of the plural pages of image memory, an image page control table 306 which comprises #1–#5 page control units 401a to 401e on the page control table 107.

The page control units 401a to 401e on the image control table 306 are accessed by an output page pointer 304 and an input page pointer 305, the output page pointer 304 points one of the page control unit 401a to 401e corresponding to the image memory to be next outputted, the input page pointer 304 points one of the page control units 401a to 401e corresponding to the image memory to which the image pattern of the input data is to be written through the page buffer 307, or one of the page control units 401a to 401e to which the image is to be next written.

The page buffer 307 is secured for each memory segment managed by the memory control table 108, and each time the memory area is short, a vacant area of the memory control table 108 is searched and a buffer pointer 311 is linked to the head of the page buffer 307.

Figure 17:
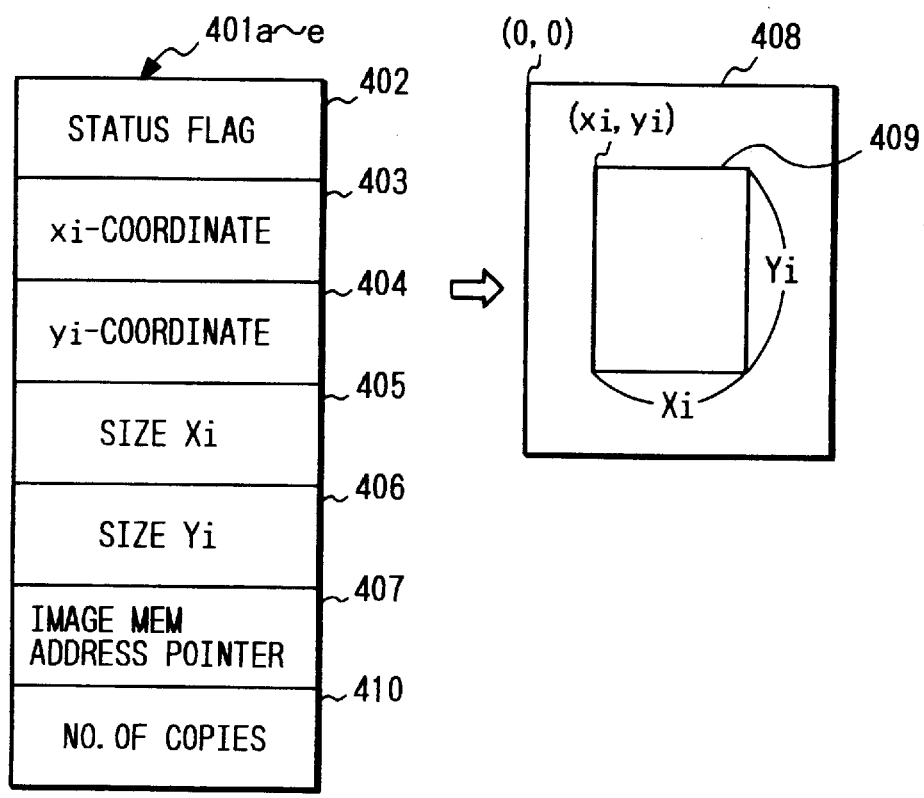
FIG. 17 shows a structure of a page control unit on the page control table.

FIG. 17 shows a print area on a sheet corresponding to the internal structure of the page control units 401a to 401e.

The page control units 401a to 401e contain various control information on one page of output image. A status flag indicating status of the page control units 401a to 401e is stored in a status flag 402, which holds one of status "vacant", "input in process", "output stand-by" and "output in process". The "vacant" status indicates that the page control units 401a to 401e are not used. The "input in process" status indicates that the page control unit 1401a to 401e is writing the input data from the page buffer 307 into the corresponding image memory as an image pattern. The "output stand-by" status indicates that the page control units 401a to 401e stand by the start of print. The "output in process" status indicates that the printing of the image data for the page control unit 401a to 401e is being conducted.

Numerals 403 and 404 denote areas for storing a left top corner coordinate $(x_i, y_i)$ of the image area to indicate a position on a real sheet of one page of output image generated on the image memory. Numerals 405 and 406 denote areas for storing an x axis magnitude $x_i$ and a y axis magnitude $y_i$ of the corresponding one page of output image. Numeral 409 indicates a position and a size of the output image on a form 408. The coordinate has an origin point at the left top corner of the form. The left top corner coordinate $(x_i, y_i)$ and the magnitudes $x_i$ and $y_i$ of the output image area are calculated by checking an effective print area to be used by the input data when one page of input data is entered in to the page buffer 307 through the input interface circuit 103.

When an image pattern is generated on the image memory from the input data on the page buffer 307, a required memory capacity is calculated based on the magnitude $x_i$ 405 and the magnitude $y_i$ 406 and the image memory of the required capacity is secured on the page memory 106. Numeral 407 denotes an image memory address pointer which contains a head address of the secured image memory.

The page buffer 307 and the image memories 308, 309 and 310 are sequentially secured in the ascending order of the address by checking the memory control table 108 and they are released when the output is completed.

Numeral 410 denotes a copy count setting area for storing a preset count when the image memory pointed by the image memory address pointer 407 is to be printed out to a plurality of sheets. The copy count is indicated by a command input from the host computer 102. A mechanism to set the copy count is now explained with reference to FIGS. 18 and 19.

Figure 18:
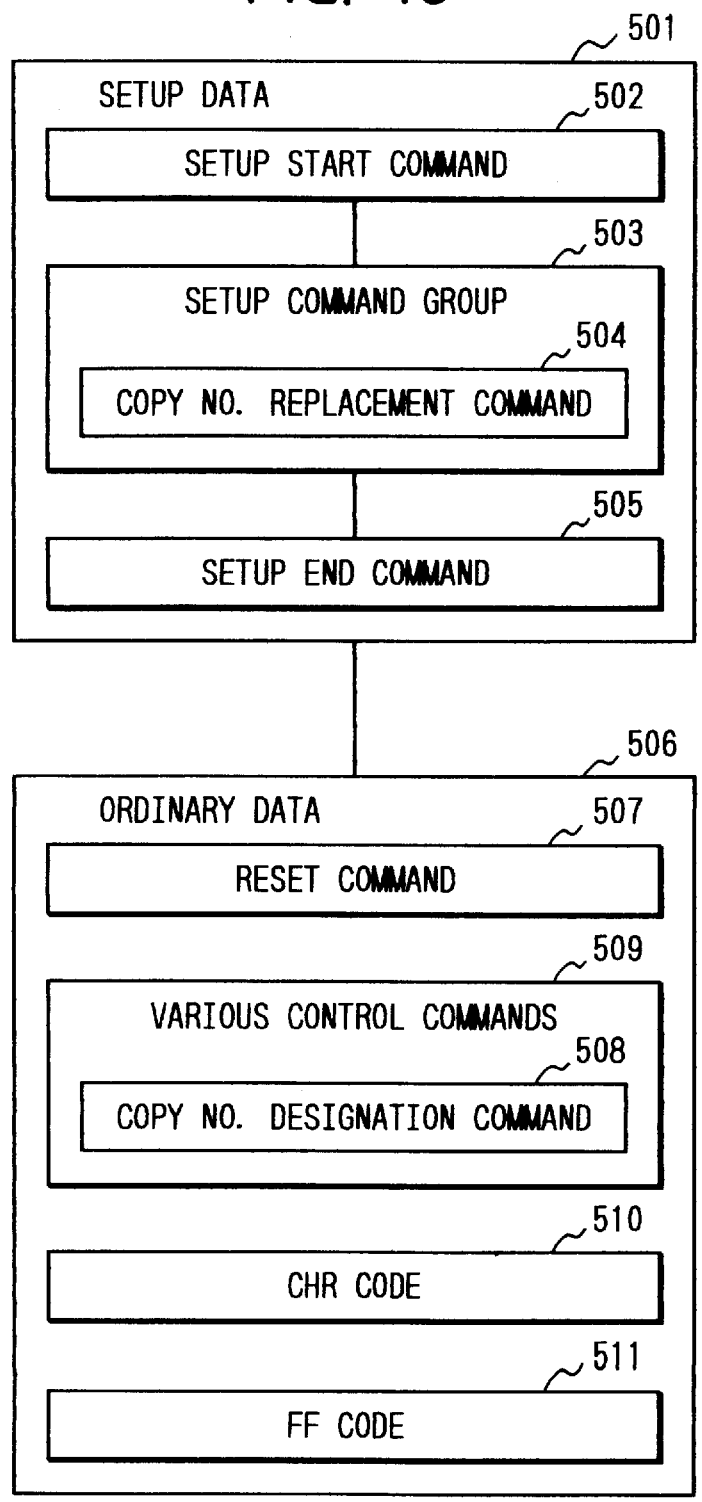
FIG. 18 shows a format of a data group entered from a host computer.

FIG. 18 shows an input scheme of data supplied from the host computer 102.

Numeral 501 denotes set-up data for imparting modification to the control system for normal data shown by 506 and it has the following data flow.

Numeral 502 denotes a start of set-up command indicating the head of the set-up data 501, followed by a set-up command group 503 for indicating the substitution of the control parameter.

In the present embodiment, the control of the copy count is described later, and a copy count substitution command 504 in the set-up command group 503 is first explained, the copy count substitution command 504 cancels the copy count indication in the normal data 506 and validates the copy count given by this command. The control operation thereof will be described later.

Numeral 505 denotes an end of set-up command indicating the end of the set-up data 501 and that the subsequent data is the normal data.

The normal data 506 comprises a group of various control commands 509 represented by a reset command 507 for resetting various control data (the copy count setting in the present example) and a copy count designation command 508 for designating the copy count, a character code 510 and an FF (form feed) code 511 for indicating a start of a new page, and they may be combined in any manner to form a series of print pages.

FIG. 19 shows a storage location and an update operation of the copy count which is one of the control parameters.

Numeral 601 denotes a control parameter reset value table for storing preset reset values of the control parameters on the program ROM 104. The reset value of the copy count is fixedly set in a copy count reset value area 602 as one element of this table 601. Numeral 603 denotes a control parameter table on the work RAM area 114 which is referred to and updated by a printer control program 700 to be described later for the print control. A control parameter value and a substitution flag are prepared as elements for each parameter. For the copy count, a current copy count area 604 for storing the currently designated copy count and a copy count substitution flag (605 in FIG. 19) which indicates whether the copy count substitution has been commanded by the copy count substitution command (504 in FIG. 18) or not are provided.

A substitution control parameter table 606 for storing the substitution value of the control parameter to which the substitution has been commanded by the set-up command group (501 in FIG. 18) is provided on the work RAM area 114, and for the copy count, a copy count substitution area 607 for storing the substitution count commanded by the copy count substitution command 504 is provided on the table 606. A copy counter 608 which is used by an output task 800 to be described later to count the number of copies is provided on the work RAM area 114.

In the table, the current copy count 604 which is the control parameter of the copy count is updated in the following manner.

When the copy count substitution command 504 in the set-up data (501 in FIG. 18) is supplied, the designated count is stored in the copy count substitution area 607 and the copy count substitution flag 605 is set (ON). When normal data (506 in FIG. 18) is supplied, the current copy count 604 is normally reset by the copy count reset value 602 of the reset command 507. If the copy count substitution flag has been set, however, the value in the copy count substitution area 607 is given a priority and it is set to the current copy count 604. Similarly, when the copy count designation command (508 in FIG. 18) is supplied, the designated value is normally set to the current copy count 604 but if the copy count flag has been set, the value in the copy count substitution area 607 is given a priority and it is set to the current copy count 604.

Detail of the copy count substitution control in the present embodiment is now explained with reference to a flow chart of the printer control program 700 of FIGS. 20A to 22 based on the mechanism of the copy count setting described above.

The printer control program adopts a multi-task system having a real time motor, and a timer control is conducted by the timer interruption signal S01 from the timer unit 109 of FIG. 14. Major tasks are an input task 700 and an output task 900 to be described later, and an input process for preparing one page of output image and an output process for printing out the prepared output image are parallelly processed.

Figure 20B:
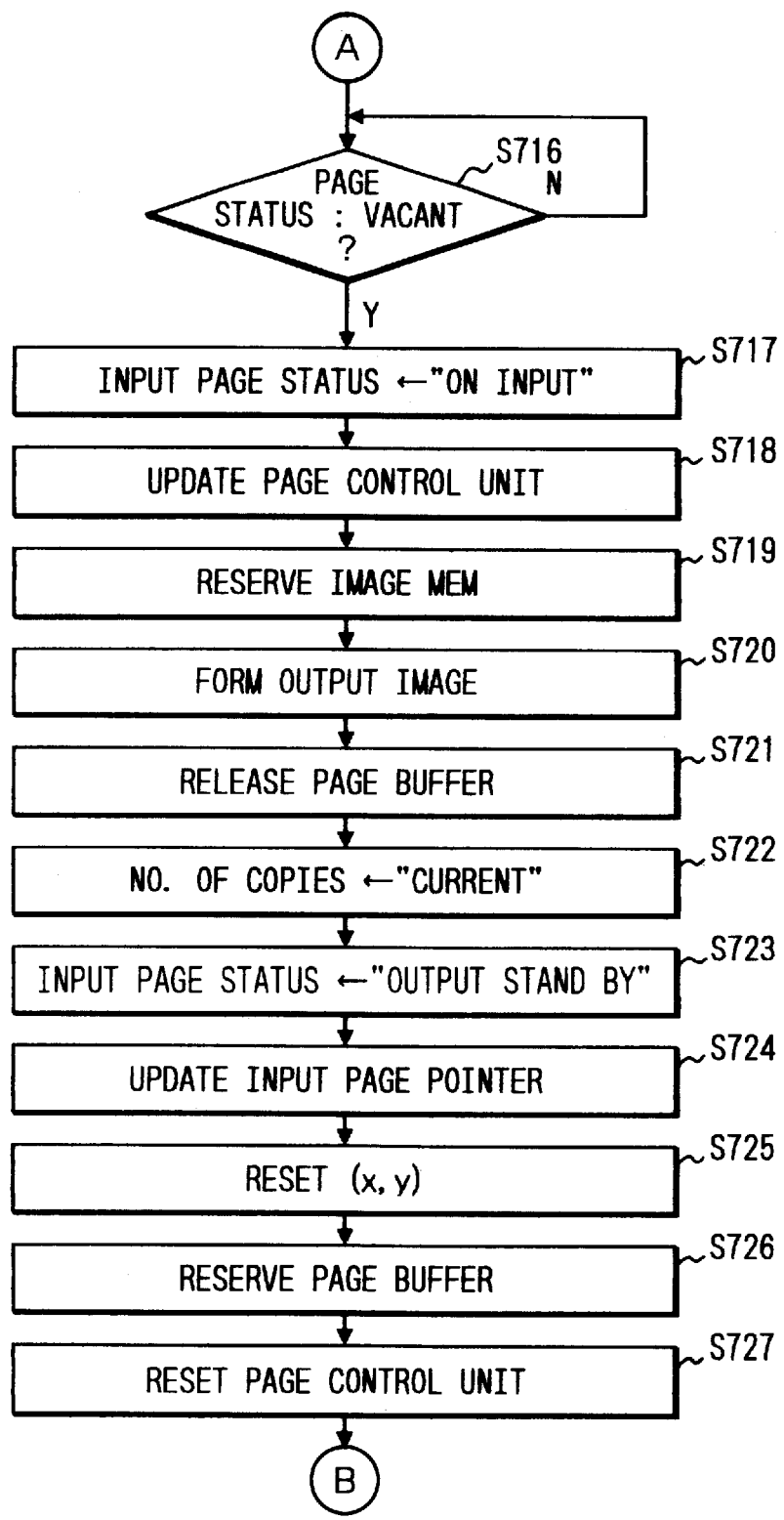
FIG. 20 is comprised of FIGS. 20A and 20B showing flow charts of an input task which is a main routine of printer control program.

FIGS. 20A and 20B show flow charts of the input task which is the main task of the printer control program 700. The input process is explained below in detail.

In a step S701, various variables are initialized. Main variables used in the input task include the following: a coordinate (x, y) representing a print position of an input code, where (x, y) is represented by a coordinate having an origin point (0, 0) at a left top corner of a form, and minimum x $x_{min}$, maximum x $x_{max}$, minimum y $y_{min}$ and maximum y $y_{max}$ for reserving minimum value and maximum values of x and y in one page. Thus, an area surrounded by four points having coordinates ($x_{min}$, $y_{min}$−h), ($x_{min}$, $y_{max}$), ($x_{max}$+w, $y_{min}$−h) and ($x_{max}$+w, $y_{max}$) is an effective print area of the page, that is, an area requiring the image memory, where w is a character width of a character pattern and h is a character height.

The print position (x, y) is at a position corresponding to a left bottom corner of a character pattern frame, and x is advanced to the left by w for each character, and y is advanced downward by h by a carriage return.

The current copy count 604 is initialized by the copy count reset value 602. Similarly, the control parameter table 603 is initialized by the content of the control parameter reset value table 601.

When the initialization of the variables is completed in the step S701, the process proceeds to a step S702 to check the memory control table 108 and secure one memory segment of page buffer 307 to update it by the memory control table 108. Then, in a step S703, the data volume area 302 is first cleared to update the page buffer control unit 301 and the head address of the page buffer 307 secured in the step S701 is set. Then, in a step S704, the input data from the host computer 102 is read through the character interface circuit 103 and the input data is checked in a step S705. If the input data is a command, a command analysis process to be described later is carried out in a step S706 and the process returns to S704. If the input data is a character code, a character process of steps S707–S715 is conducted. In the steps S707–S712, the current print position is compared with $x_{min}$, $x_{max}$, $y_{min}$ and $y_{max}$, and if (x, y) exceeds the minimum value of the maximum value, the corresponding variables of $x_{min}$, $x_{max}$, $y_{min}$ and $y_{max}$ is updated by using (x, y) as a new minimum value or maximum value.

Then, in a step S713, the input buffer (character code) is stored in the page buffer 307A. If the memory segment of the page buffer 307 is full, the memory control table 108 is checked and one memory segment of page buffer is secured and the address thereof is set in the buffer pointer 311. In a step S714, the print position (x, y) is updated to the next position. In a step S715, the data volume area 302 on the page buffer control unit 301 is incremented by one. When one character code has been processed, the process returns to the step S704 and proceeds to the processing of the next input data.

If the input data is an FF (form feed) code indicating the end of one page in the check of the step S705, the end of page process is conducted in steps S716–S727.

Assuming, for example, that the current input page pointer 305 points the #3 page control unit 401c, the page status 402 of the #3 page control unit 401c is checked and the process waits until the vacant status or the ready status is reached. Then, in a step S717, the input page status 402 is set to "input in process" to indicate that the input task is using the #3 page control unit 401c. In a step S718, the control information 403–406 of the page control unit 401c are updated by $x_{min}$, $x_{max}$, $y_{min}$ and $y_{max}$ in the following manner.

$x_i = x_{min}, y_i = y_{min} - h,$ $x_i = x_{max} + w - x_{min},$ $y_i = y_{max} - (y_{min} - h)$ In a step S719, the capacity of the image memory is calculated based on $x_i$ and $y_i$ calculated in the step S718, and the memory control table 108 is checked to secure the image memory 310 on the page memory 106. Then, in a step S720, one page of character codes stored in the page buffer 307 is read and the corresponding character patterns are read from the font memory 105 and it is written into the image memory 310 to generate one page of output image. When one page of output image is completed, the memory control table 108 is updated in a step S721 to release the area of the page buffer 307. In a step S722, the current copy count 604 is set to the copy count setting 410 of the page control unit 401c to fix the copy count. In a step S723, the "output stand-by" is set to the page status 402 to inform the ready for the output to the output task. In a step S724, the input page pointer 305 is shifted to the next page control unit 401d.

As the preparation to the next page processing, the print position (x, y) is reset to (0, 0) in a step S725, one memory segment of page buffer 307 is secured in a step S726 as it is in the step S702. In a step S727, the data volume area 302 is cleared as it is in the step S703 and the page buffer address 303 is updated and the end of the page process is terminated. Then, the process returns to the step S704 to start the next page input process.

Figure 21B:
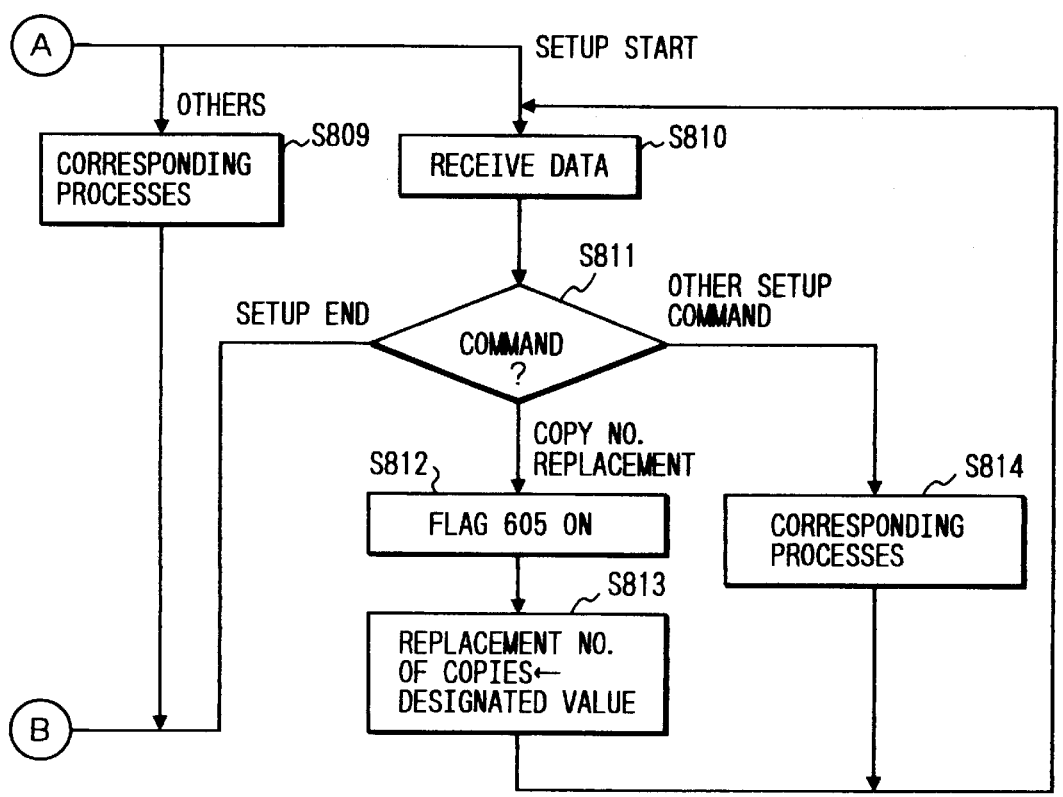
FIG. 21 is comprised of FIGS. 21A and 21B showing flow charts of a command analysis process of the printer control program.

FIGS. 21A and 21B show detail of the command analysis process of the step S706 of the flow charts of FIGS. 20A and 20B. In FIGS. 21A and 21B, a command inputted in a step S801 is checked and corresponding process is conducted.

If it is a reset command 507, the reset process of steps S802–S805 is conducted. In the step S802, the control parameters are reset. Namely, the values of the control parameter table 603 are reset by the values of the control parameter reset value table. For the copy count having the substitution flag defined, the process proceeds to a step S803 to check if the copy count substitution flag 605 has been set (ON) or not. If the flag 605 has been set, the process proceeds to a step S804 to set the copy count substitution value 607 to the current copy count 604 which is the control parameter, and if the flag 605 is OFF, the copy count reset value 602 is set to the current copy count 604 in a step S805 as other control parameters are, and the reset process is terminated and the command analysis process is terminated.

If the input command is a copy count designation command 508 in the check of the command in the step S801, a copy count designation process of steps S806–S808 is conducted. In the step S806, whether the copy count substitution flag 605 is ON or not is checked. If it is ON, the process proceeds to a step S807 to set the copy count substitution value 607 to the current copy count, and if the flag 604 is OFF, the value designated by the copy count designation command 508 is set to the current copy count 604. Then, the copy count designation process is terminated and the command analysis process is terminated.

If the decision in the step S801 is the input command or the control command 509 of other normal data (other than the copy count designation command), the process for the control command is executed in a step S809 and the command analysis process is terminated.

If the input command is the start of set-up command 502 in the decision in the step S801, set-up data analysis process of steps S810–S814 is conducted. In the step S810, the next input data is received, and in a step S811, the input data (input command) is checked. If the input command is the end of set-up command 505, the command analysis process is terminated. If the input command is the copy count substitution command 504 in the input command check of the step S811, the copy count substitution flag 605 is set to ON in a step S812 and the input of the substitution command 504 is stored, and in a step S813, the copy count designated by the command 504 is set to the copy count substitution value 607. The process then returns to the step S810 to wait for the next input data. If the decision in the step S811 is other set-up command 503 (other than the copy count substitution command 504), the process proceeds to a step S814 to conduct a corresponding process, and then the process returns to the step S810 to wait for the next input data.

The process of the output task 900 and the control of the copy count output are explained with reference to a flow chart of FIG. 22.

As described above, the printer control program adopts the multi-task system using the real time motor and the timer control is done by the timer interruption signal S01 from the timer unit 109 of FIG. 14. The tasks include the input task 700 (FIGS. 20A and 20B) and the output task 900 (FIG. 22).

In a step S901, the page status 402 of the #1 page control unit 401a pointed by the output page pointer 304 is checked and the process waits until the "output stand-by" status appears, that is, until the output image is prepared. When the "output stand-by" status is reached, the value of the copy count setting 410 of the page control unit 401a is set to the copy counter 608 as the definition to the page copy count in a step S902. In a step S903, the printer start signal S03 is outputted to start the LBP print unit.

In a step S904, blank data is sent to the scan buffer 110 for a section from the top end of the form to the beginning of the actual print, that is, 0–$y_i$ (where $y_i$ is the $y_i$ coordinate 404 on the page control unit 401a) in the y coordinate to create a blank section on the form.

In a step S905, the image data prepared on the image memory 308 is transferred to the scan buffer 110. In order to get a blank for a write section along the x axis, the write position to the scan buffer 110 is shifted by $x_i$ and the transfer data amount is set to $x_i$ and the data of $y_i$ scan is transferred. In this manner, the image is printed out at a predetermined position on the form. In the above, $x_i$, $x_i$ and $y_i$ represent the $x_i$ coordinate 403 of the page control unit 401a, the magnitude $x_i$ 405 and the magnitude $y_i$ 406, respectively.

When the output of the image data is completed, the process proceeds to a step S906 to decrement the copy counter 608 by one and in a step S907, whether the copy counter is zero or not is checked. The steps S903–S907 are repeated until the copy counter 608 reaches zero. When the predetermined number of prints have been made, the process proceeds to a step S908 to updated the memory control table 108 and release the area of the image memory 308. In a step S909, the output page status 402 of the page control unit 401a is rendered "vacant" and in a step S910, the output page pointer 304 is shifted to the next page control unit 401b and one page of output process is terminated. When one page of output process is terminated, the process returns to the step S901 and the output process of the next page is started.

As described above, the substitution flag and the store location of the substitution parameter are prepared for the control parameter such as the copy count, and if the substitution flag is set, the substitution parameter is given a higher priority than the reset value and the command designation value so that the operation of the existing normal data can be modified as desired.

Further, the set-up command group 503 is separated from the normal data 506 and it is surrounded by the start of set-up command 502 and the end of set-up command 505 to form the set-up data 501. Accordingly, the set-up command group is not mixed with the data created by the user and the form of modification to the existing data (normal data) by the external command is maintained.

The command group for modifying the settings of the print data group may be called as the print environment setting modification command group (set-up job).

While the copy count is used as the control parameter to be substituted in the present embodiment, the present invention is not limited thereto and is applicable to various control parameters.

Figure 23:
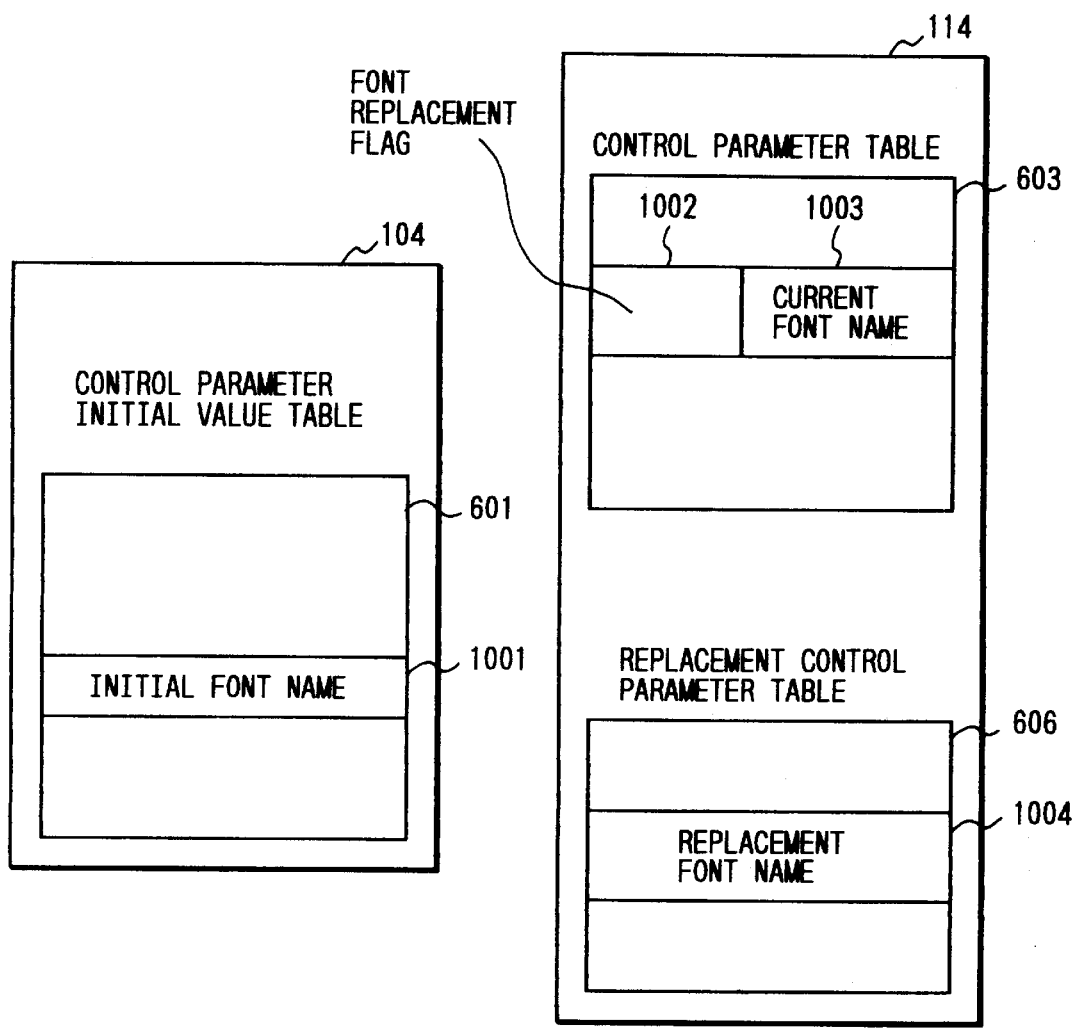
FIG. 23 shows a data structure of font selection; ad

For example, where a plurality of fonts are provided and the host computer issues a font selection command to select a desired font, a font selection substitution command may be provided to the font selection command as one of the set-up commands to permit the internal substitution of the selection. In this case, as shown in FIG. 23, a reset font name 1001 for defining a name of the font to be returned when a reset command is received is provided on the control parameter table 601 like the copy count control. The control parameter table 603 is provided with a current font name 1003 in which the name of the currently selected font is set and a font substitution flag 1002 which indicates that the font selection substitution command has been inputted, that is, the font substitution request has been issued. A substitution font name 1004 in which the name of the substitution font designated by the font selection substitution command is set is added to the substitution control parameter table 606.

Figure 24:
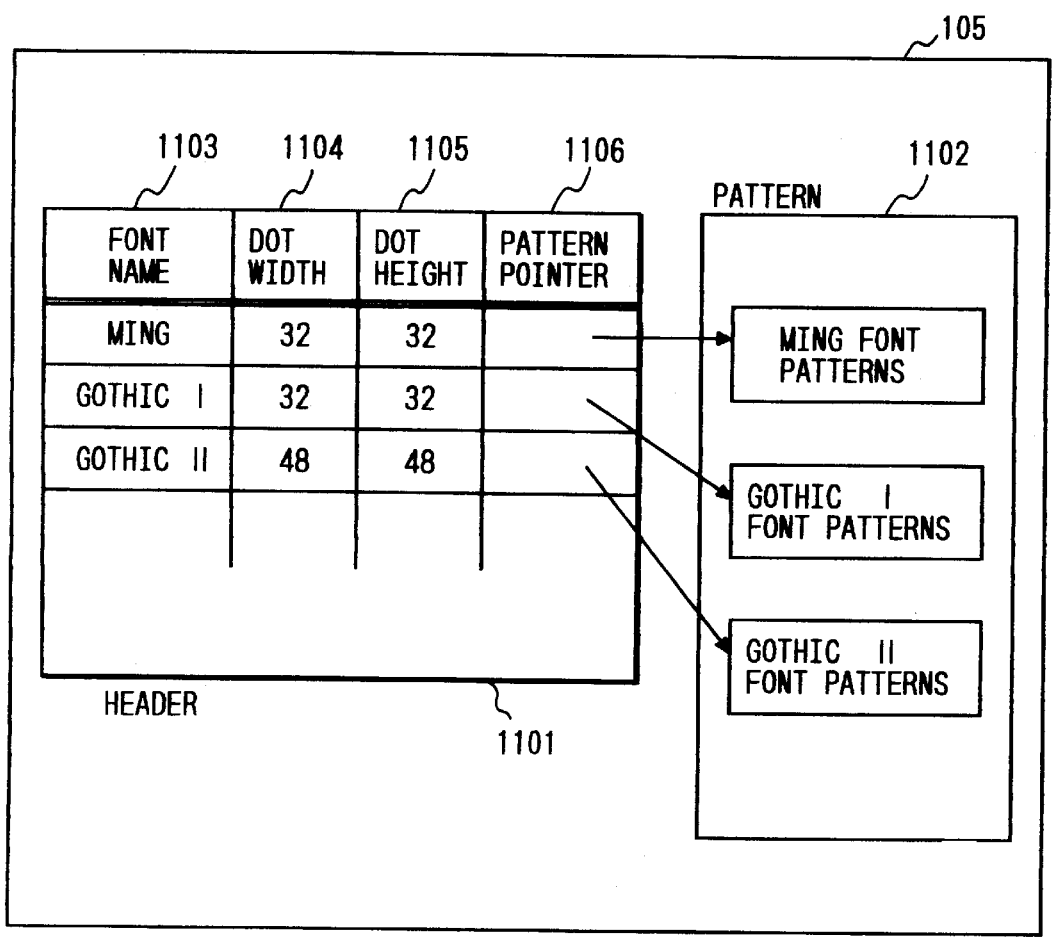
FIG. 24 shows a storage format of a font on a font memory.

FIG. 24 shows an internal structure of the font memory 105 which contains a plurality of fonts. The font memory 105 is divided into a header area 1101 and a pattern area 1100. The header area 1101 includes font names 1103 of the plurality of fonts, a dot width 1104 of the character size and a dot height 1105, and the pattern area 1102 includes a table of pattern pointers 1106 to the actual character dot patterns arranged in the order of character code. The pattern area 1102 stores the character dot patterns for the respective fonts in the order of character code.

When the character code is stored into the page buffer 307, the value of the current font name 1003 and the character code are stored as a pair. In the information of the output image (the step S720 of FIG. 20B), the header area 1101 on the font memory 105 is searched by the font name of the pair of the font name and the character code read from the page buffer to select the desired font, and the dot pattern of the character corresponding to the character code is read from the font pattern group of the pattern area pointed by the corresponding pattern pointer 1106 so that the printing is made by the font designated by the current font name 1103. In the above mechanism, when the font selection substitution command is applied, the font substitution flag 1102 is set to ON and the name of the designated substitution font is set in the substitution font name 1104. Even if the reset command or the font selection command is applied, the substitution font name 1104 is set to the current font name if the font substitution flag is ON. As a result, the current font, that is, the substitution font is selected in the output image formation 720.

The substitution of the font selection is effective particularly when the font is supplied by a cartridge. For example, when a new font cartridge has been developed and a font therein, for example, a writing brush font is to be used but the command of the existing data is designated by a Ming font, the substitution to the writing brush may be commanded by the font selection substitution command as the set-up command before the existing data is entered.

If the font substitution flag is ON when the font selection command is inputted, the substitution font name 1004 is set to the current font name 1003. The character size (the dot width 1104 and the dot height 1105) designated by the font selection command is compared with the character size (the dot width 1104 and the dot height 1105) of the substitution font 904 and the substitution font 904 may be selected only when they match. As a result, the font substitution is made between the fonts of different sizes and row overflow is prevented.

In this manner, the attributes of the substitution parameter and the indication parameter are checked and the substitution is made only when the attributes are equal so that the disturbance of the output image is prevented.

In the present embodiment, the substitution of the designation is made for the control command for modifying the control parameter on the normal data. The present invention is not limited thereto but it is applicable to the control parameter having no control command, for example, where the printer itself selects an appropriate control parameter as the case may be when the control parameter is changed to a predetermined value by initialization or the data preferentially selects the first-come input interface of a plurality of input interfaces.

In this case, the substitution flag and the substitution parameter are given by the substitution command, and if the substitution flag is ON when the control parameter is updated, the substitution parameter is selected as the current control parameter so that the predetermined value selected by the reset and the parameter automatically selected in accordance with the status is forcibly modified by the set-up command group.

In the present embodiment, the control parameter reset table is set on the program ROM as the identified value. The present invention is not limited thereto but a non-volatile RAM may be provided and the control parameter reset table may be provided on the non-volatile RAM. In this case, by substituting the predetermined value on the control parameter reset table by the designated value by the set-up command group, the designated value may be reserved without regard to the power-on or power-off status.

In the present embodiment, the substitution of the control command used in the existing data has been described, but the present invention is not limited thereto and it is applicable to a newly added control parameter.

For example, where the existing data designates a so-called form overlay function in which a form and print data are printed out in overlay and comprises a registered form and the print data, a color printer is newly prepared and the color designation is added to the registered form data. In this case, the control command for the color designation is not included in the registered form because it was not defined when the data was prepared. In such a case, the color designation command of the registered form data is provided in the new color printer as the set-up command group and the color designation of the form is prepared as the control parameter. By providing the substitution flag and the substitution form color as they are in the present embodiment, the substitution form color is adopted as the current form color designation when the existing data is inputted and the reset command is issued so that the form color can be printed out in the existing data.

In the present embodiment, the content of the corresponding parameter of the substitution control parameter group is set for the substitution designation by the set-up command group and the corresponding substitution flag of control parameter table group is set. The present invention is not limited thereto but the substitution value may be set to the corresponding current parameter of the control parameter table group at the time of the process.

As a result, the operation of the existing data may be modified by the set-up command if the set-up command is previously supplied even if the reset command is not included in the existing data.

As described above, the print operation of the existing data may be modified by modifying the content of the setting of the control parameter by the presence or absence of the previous substitution request for the designated control parameter.

Further, the operation may be modified for the control parameter reset by the reset command without another command, in addition to the modification of the content in the existing print data designated by the command.

For the newly added function of the printer, the substitution of the control parameter is commanded before the input of the data and the reset value of the corresponding control parameter is substituted when the existing data is reset so that the application of the new function to the existing data is attained.

In accordance with the present invention, an output method and apparatus are provided which are capable of storing the first control information for controlling the output operation based on the externally supplied data and the command information for commanding the modification of the first control information to the other second control information, and which, when the command information is stored, modify the first control information to the second control information to control the output operation.

In accordance with the present invention, an output method and apparatus are provided, which can designate that portion of control information for controlling an output operation based on the data sent from an external device, which is valid for the data and output the data relating to that portion in accordance with the control information.

In accordance with the present invention, an output method and apparatus are provided, which sequentially receive a plurality of types of control information for controlling the output operation based on data sent from an external device and control the output operation in accordance with the first received control information.

In accordance with the present invention, an output method and apparatus are provided,. which store first control information for controlling an output operation based on data sent from an external device and command information for modifying the first control information to second different control information, and when the command information has been stored, modify the first control information to the second control information and control the output operation.

What is claimed is:

1. An output method carried out in an output apparatus which executes an output operation for data supplied from an external source, in accordance with a plurality of parameters included in the supplied data, said method comprising the steps of:

storing command information for commanding modification of at least one of the plurality of parameters to another parameter that is different from the at least one parameter; and modifying, in response to the stored command information, the at least one parameter to the another parameter to control the output operation for the data supplied from the external source in accordance with the another parameter and in accordance with the plurality of parameters except for the at least one parameter, the another parameter being supplied from the external source earlier than the at least one parameter.

2. An output method according to claim 1, wherein said storing step comprises storing the command information based on data for identifying the at least one of the plurality of parameters and the another parameter.

3. An output method according to claim 1, wherein the data supplied from outside the output apparatus is supplied from a host computer.

4. An output method according to claim 1, wherein the output operation is executed using a laser beam printer.

5. An output method according to claim 1, wherein the output operation is executed using an ink jet printer.

6. An output apparatus for executing an output operation for data supplied from an external source, in accordance with a plurality of parameters included in the supplied data, said apparatus comprising:

memory means for storing command information for commanding modification of at least one of the parameters to another parameter that is different from the at least one parameter; and control means for modifying, in response to the command information stored in said memory means, the at least one parameter to the another parameter to control the output operation for the data supplied from the external source in accordance with the another parameter and in accordance with the plurality of parameters except for the at least one parameter, the another parameter being supplied from the external source earlier than the at least one parameter.

7. An output apparatus according to claim 6, wherein said memory means stores the command information based on data for identifying the at least one of the plurality of parameters and the another parameter.

8. An output apparatus according to claim 6, wherein the data supplied from outside is supplied from a host computer.

9. An output apparatus according to claim 6, wherein the output operation is executed using a laser beam printer.

10. An output apparatus according to claim 6, wherein the output operation is executed using an ink jet printer.

11. An output method carried out in an output system comprising an output apparatus and outputting means, which executes an output operation for data supplied from a computing means to the output apparatus, in accordance with a plurality of parameters included in the supplied data, said method comprising the steps of:

storing command information for commanding modification of at least one of the plurality of parameters to another parameter that is supplied from the computing means and is different from the at least one parameter; and modifying, in response to the stored command information, the at least one parameter to the another parameter to control the output operation for the data supplied from the computing means in accordance with the another parameter and in accordance with the plurality of parameters except for the at least one parameter, the another parameter being supplied from the computing means earlier than the at least one parameter.

12. An output method according to claim 11, wherein said storing step comprises storing the command information based on data for identifying the at least one of the plurality of parameters and the another parameter.

13. An output method according to claim 11, wherein the output operation is executed using a laser beam printer.

14. An output method according to claim 11, wherein the output operation is executed using an ink jet printer.

15. An output system comprising:

computing means for outputting data and information; and an output apparatus for executing an output operation for the data supplied from said computing means in accordance with a plurality of parameters included in the supplied data, said output apparatus comprising:

memory means for storing command information for commanding modification of at least one of the plurality of parameters to another parameter that is supplied by said computing means and is different from the at least one parameter; and control means for modifying, in response to the command information stored in said memory means, the at least one parameter to the another parameter to control the output operation for the data supplied from said computing means in accordance with the another parameter and in accordance with the plurality of parameters except for the at least one parameter, the another parameter being supplied from said computing means earlier than the at least one parameter.

16. An output system according to claim 15, wherein said memory means stores the command information based on data for identifying the at least one of the plurality of parameters and the another parameter.

17. An output system according to claim 15, wherein the output operation is executed using a laser beam printer.

18. An output system according to claim 15, wherein the output operation is executed using an ink jet printer.

19. A computer-readable memory medium storing a program for performing an output method carried out in an output apparatus which executes an output operation for data supplied from an external source in accordance with a plurality of parameters included in the supplied data, the program stored on said computer-readable memory medium comprising the steps of:

storing command information for commanding modification of at least one of the plurality of parameters to another parameter that is different from the at least one parameter; and modifying, in response to the stored command information, the at least one parameter to the another parameter to control the output operation for the data supplied from the external source in accordance with the another parameter and in accordance with the plurality of parameters except for the at least one parameter, the another parameter being supplied from the external source earlier than the at least one parameter.

20. A computer-readable memory medium according to claim 19, wherein said storing step comprises storing the command information based on data for identifying the at least one of the plurality of parameters and the another parameter.

21. A computer-readable memory medium according to claim 19, wherein the supplied from outside the output apparatus is supplied from a host computer.

22. A computer-readable memory medium according to claim 19, wherein the output operation is executed using a laser beam printer.

23. A computer-readable memory medium according to claim 19, wherein the output operation is executed using an ink jet printer.

24. A computer-readable memory medium storing a program for performing an output method carried out in an output system including an output apparatus and outputting means, which executes an output operation for data supplied from a computing means to the output apparatus in accordance with a plurality of parameters included in the supplied data, the method performed by the program stored on said computer-readable memory medium comprising the steps of:

storing command information for commanding modification of at least one of the plurality of parameters to another parameter that is supplied from the computing means and is different from the at least one parameter; and modifying, in response to the stored command information, the at least one parameter to the another parameter to control the output operation for the data supplied from the computing means in accordance with the another parameter and in accordance with the plurality of parameters except for the at least one parameter, the another parameter being supplied from the computing means earlier than the at least one parameter.

25. A computer-readable memory medium according to claim 24, wherein said storing step comprises storing the command information based on data for identifying the at least one of the plurality of parameters and the another parameter.

26. A computer-readable memory medium according to claim 24, wherein the output operation is executed using a laser beam printer.

27. A computer-readable memory medium according to claim 24, wherein the output operation is executed using an ink jet printer.

* * * * *

UNITED STATES PATENT AND TRADEMARK OFFICE
CERTIFICATE OF CORRECTION

PATENT NO. : 5,822,499

DATED : October 13, 1998

INVENTOR(S) : KUNIO OKADA, ET AL.

Page 1 of 3

It is certified that error appears in the above-identified patent and that said Letters Patent is hereby corrected as shown below:

COLUMN 2

Line 16, "effects to" should read --affects--.

COLUMN 3

Line 57, "ad" should read --and--.

COLUMN 7

Line 51, "affect to" should read --effect on--.

Column 8

Line 8, "a" should read --to a--; and
    Line 38, "proceeds" should read --process proceeds--.

UNITED STATES PATENT AND TRADEMARK OFFICE
CERTIFICATE OF CORRECTION

PATENT NO. : 5,822,499

DATED : October 13, 1998

INVENTOR(S) : KUNIO OKADA, ET AL.

It is certified that error appears in the above-identified patent and that said Letters Patent is hereby corrected as shown below:

COLUMN 10

Line 9, "arrange" should read --arranged--.

COLUMN 11

Line 67, "unit" should read --units--.

COLUMN 12

Line 21, "unit" should read --units--, and "1401a" should read --401a--;
    Line 22, "is" should read --are--; and
    Line 27, "unit" should read --units--.

COLUMN 14

Line 15, "value" should read --values--; and
    Line 47, "is" should read --are--.

UNITED STATES PATENT AND TRADEMARK OFFICE
CERTIFICATE OF CORRECTION

PATENT NO. : 5,822,499

DATED : October 13, 1998

INVENTOR(S) : KUNIO OKADA, ET AL.

It is certified that error appears in the above-identified patent and that said Letters Patent is hereby corrected as shown below:

COLUMN 15

Line 33, "detail" should read --details--.

COLUMN 16

Line 56, "updated" should read --update--.

COLUMN 19

Line 50, "provided,." should read --provided,--.

Signed and Sealed this

Twenty-ninth Day of May, 2001

Attest:

NICHOLAS P. GODICI

*Attesting Officer*     *Acting Director of the United States Patent and Trademark Office*